US012194536B2

(12) United States Patent
TenHouten et al.

(10) Patent No.: US 12,194,536 B2
(45) Date of Patent: Jan. 14, 2025

(54) 3-D PRINTER WITH MANIFOLDS FOR GAS EXCHANGE

(71) Applicant: DIVERGENT TECHNOLOGIES, INC., Los Angeles, CA (US)

(72) Inventors: Broc William TenHouten, Los Angeles, CA (US); Eahab Nagi El Naga, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 16/678,625

(22) Filed: Nov. 8, 2019

(65) Prior Publication Data
US 2020/0147690 A1 May 14, 2020

Related U.S. Application Data

(60) Provisional application No. 62/760,305, filed on Nov. 13, 2018.

(51) Int. Cl.
*B22F 12/00* (2021.01)
*B22F 10/28* (2021.01)
(Continued)

(52) U.S. Cl.
CPC .............. *B22F 12/22* (2021.01); *B22F 10/28* (2021.01); *B22F 10/322* (2021.01); *B22F 12/70* (2021.01);
(Continued)

(58) Field of Classification Search
CPC ..... B29C 64/268; B29C 64/371; B29C 64/20; B29C 64/259; B33Y 30/00
See application file for complete search history.

(56) References Cited

U.S. PATENT DOCUMENTS 5,203,226 A  4/1993 Hongou et al.
5,742,385 A  4/1998 Champa
(Continued)

FOREIGN PATENT DOCUMENTS

DE   102015010387 A1   2/2017
EP      3378584 A1    9/2018
(Continued)

OTHER PUBLICATIONS

US 9,202,136 B2, 12/2015, Schmidt et al. (withdrawn)
(Continued)

*Primary Examiner* — Thu Khanh T. Nguyen
(74) *Attorney, Agent, or Firm* — ARENTFOX SCHIFF LLP

(57) ABSTRACT

Aspects are provided relating to additive manufacturing. In one aspect, an apparatus for producing a three-dimensional (3D) structure is described that includes a build chamber having a top portion with windows through which radiative energy from one or more sources is provided to the build chamber to produce the 3D structure, and one or more manifolds disposed within the build chamber. The manifolds are configured to perform a gas exchange within the build chamber, and each manifold is positioned above a region where envelopes of radiative energy from the one or more sources overlap. In another aspect, the manifolds are moved to a first position adjacent to the top portion of the build chamber during a first mode of operation and moved to a second position away from the top portion of the build chamber during a second mode of operation.

21 Claims, 18 Drawing Sheets

(51) Int. Cl.
*B22F 10/322* (2021.01)
*B22F 12/70* (2021.01)
*B33Y 10/00* (2015.01)
*B33Y 30/00* (2015.01)
*B22F 10/77* (2021.01)
*B22F 12/45* (2021.01)
*B22F 12/49* (2021.01)

(52) U.S. Cl.
CPC .............. *B33Y 10/00* (2014.12); *B33Y 30/00* (2014.12); *B22F 10/77* (2021.01); *B22F 12/45* (2021.01); *B22F 12/49* (2021.01)

(56) References Cited

U.S. PATENT DOCUMENTS

| | | |
|---|---|---|
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |

(56) References Cited

U.S. PATENT DOCUMENTS

| | | | |
|---|---|---|---|
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |

(56) References Cited

U.S. PATENT DOCUMENTS

| | | | |
|---|---|---|---|
| 10,307,824 B2 | 6/2019 | Kondoh | |
| 10,310,197 B1 | 6/2019 | Droz et al. | |
| 10,313,651 B2 | 6/2019 | Trevor et al. | |
| 10,315,252 B2 | 6/2019 | Mendelsberg et al. | |
| 10,336,050 B2 | 7/2019 | Susnjara | |
| 10,337,542 B2 | 7/2019 | Hesslewood et al. | |
| 10,337,952 B2 | 7/2019 | Bosetti et al. | |
| 10,339,266 B2 | 7/2019 | Urick et al. | |
| 10,343,330 B2 | 7/2019 | Evans et al. | |
| 10,343,331 B2 | 7/2019 | McCall et al. | |
| 10,343,355 B2 | 7/2019 | Evans et al. | |
| 10,343,724 B2 | 7/2019 | Polewarczyk et al. | |
| 10,343,725 B2 | 7/2019 | Martin et al. | |
| 10,350,823 B2 | 7/2019 | Rolland et al. | |
| 10,356,341 B2 | 7/2019 | Holzer et al. | |
| 10,356,395 B2 | 7/2019 | Holzer et al. | |
| 10,357,829 B2 | 7/2019 | Spink et al. | |
| 10,357,957 B2 | 7/2019 | Buller et al. | |
| 10,359,756 B2 | 7/2019 | Newell et al. | |
| 10,369,629 B2 | 8/2019 | Mendelsberg et al. | |
| 10,382,739 B1 | 8/2019 | Rusu et al. | |
| 10,384,393 B2 | 8/2019 | Xu et al. | |
| 10,384,416 B2 | 8/2019 | Cheung et al. | |
| 10,389,410 B2 | 8/2019 | Brooks et al. | |
| 10,391,710 B2 | 8/2019 | Mondesir | |
| 10,392,097 B2 | 8/2019 | Pham et al. | |
| 10,392,131 B2 | 8/2019 | Deck et al. | |
| 10,393,315 B2 | 8/2019 | Tyan | |
| 10,400,080 B2 | 9/2019 | Ramakrishnan et al. | |
| 10,401,832 B2 | 9/2019 | Snyder et al. | |
| 10,403,009 B2 | 9/2019 | Mariampillai et al. | |
| 10,406,750 B2 | 9/2019 | Barton et al. | |
| 10,412,283 B2 | 9/2019 | Send et al. | |
| 10,416,095 B2 | 9/2019 | Herbsommer et al. | |
| 10,421,496 B2 | 9/2019 | Swayne et al. | |
| 10,421,863 B2 | 9/2019 | Hasegawa et al. | |
| 10,422,478 B2 | 9/2019 | Leachman et al. | |
| 10,425,793 B2 | 9/2019 | Sankaran et al. | |
| 10,427,364 B2 | 10/2019 | Alves | |
| 10,429,006 B2 | 10/2019 | Tyan et al. | |
| 10,434,573 B2 | 10/2019 | Buller et al. | |
| 10,435,185 B2 | 10/2019 | Divine et al. | |
| 10,435,773 B2 | 10/2019 | Liu et al. | |
| 10,436,038 B2 | 10/2019 | Buhler et al. | |
| 10,438,407 B2 | 10/2019 | Pavanaskar et al. | |
| 10,440,351 B2 | 10/2019 | Holzer et al. | |
| 10,442,002 B2 | 10/2019 | Benthien et al. | |
| 10,442,003 B2 | 10/2019 | Symeonidis et al. | |
| 10,449,696 B2 | 10/2019 | Elgar et al. | |
| 10,449,737 B2 | 10/2019 | Johnson et al. | |
| 10,461,810 B2 | 10/2019 | Cook et al. | |
| 10,926,327 B2 * | 2/2021 | Sutcliffe | B33Y 30/00 |
| 11,014,304 B2 * | 5/2021 | Wakelam | B29C 64/153 |
| 2006/0108783 A1 | 5/2006 | Ni et al. | |
| 2014/0277669 A1 | 9/2014 | Nardi et al. | |
| 2014/0287080 A1 * | 9/2014 | Scott | B33Y 40/00 |
| | | | 425/174.4 |
| 2015/0174823 A1 | 6/2015 | Wiesner et al. | |
| 2016/0114432 A1 * | 4/2016 | Ferrar | B33Y 40/00 |
| | | | 219/76.12 |
| 2016/0136731 A1 | 5/2016 | McMurtry et al. | |
| 2017/0113344 A1 | 4/2017 | Schönberg | |
| 2017/0120330 A1 | 5/2017 | Sutcliffe et al. | |
| 2017/0203517 A1 * | 7/2017 | Crear | B29C 64/393 |
| 2017/0341309 A1 | 11/2017 | Piepenbrock et al. | |
| 2018/0186067 A1 | 7/2018 | Buller et al. | |
| 2020/0061655 A1 * | 2/2020 | Wakelam | B29C 64/153 |
| 2020/0094320 A1 * | 3/2020 | Krol | B33Y 40/00 |

FOREIGN PATENT DOCUMENTS

| | | |
|---|---|---|
| WO | 1996036455 A1 | 11/1996 |
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report & Written Opinion received in PCT/US2019/061134 mailed Jan. 13, 2020.
Extended European Search Report in EP19884309.6, mailed Nov. 9, 2022, 11 pages.

* cited by examiner

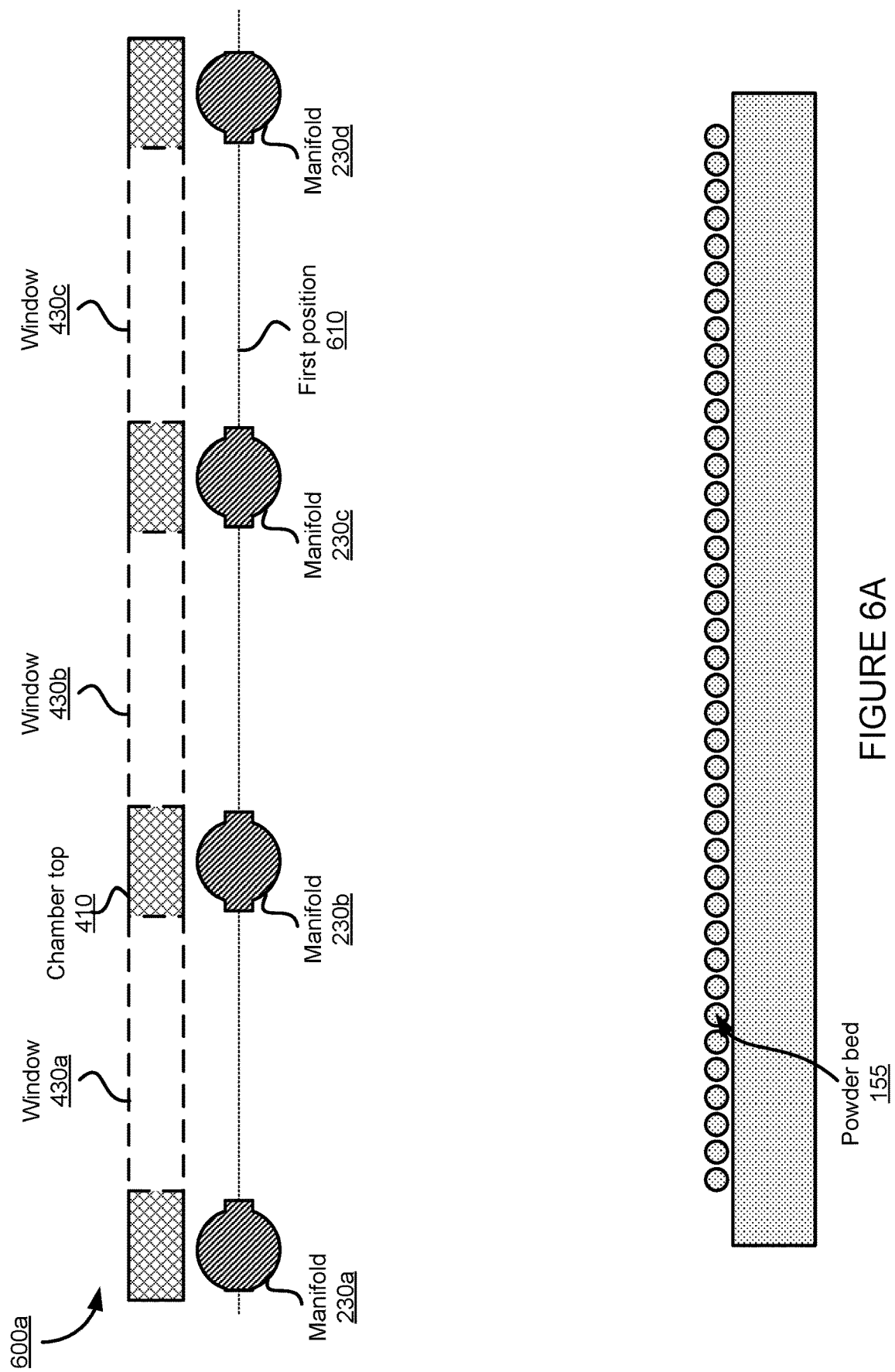

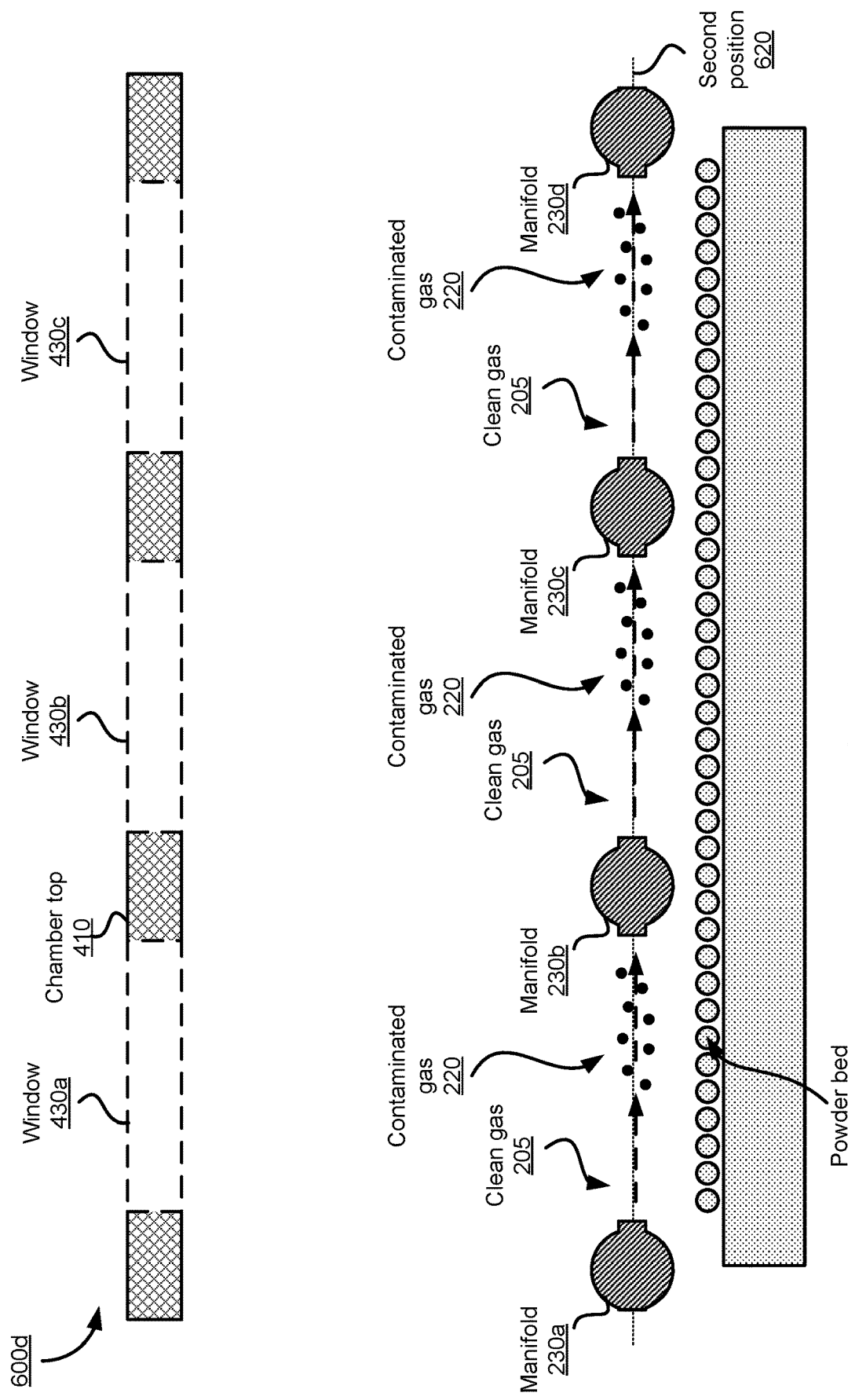

3-D PRINTER WITH MANIFOLDS FOR GAS EXCHANGE

CROSS-REFERENCE TO RELATED APPLICATION(S)

This application claims the benefit of U.S. Provisional Application Ser. No. 62/760,305, entitled "3-D PRINTER WITH MANIFOLDS FOR GAS EXCHANGE ENABLING LASER AVOIDANCE AND GRID-LIKE PLENUMS FOR GAS EXCHANGE OVER PRINT AREAS" and filed on Nov. 13, 2018, which is expressly incorporated by reference herein in its entirety.

BACKGROUND OF THE DISCLOSURE

Field

The present disclosure relates generally to techniques for additive manufacturing (AM), and more specifically to techniques for 3-D printing that include manifolds for gas exchange enabling laser avoidance and grid-like plenums for gas exchange over print areas.

Background

Additive Manufacturing (AM) processes involve the use of a stored geometrical model for accumulating layered materials on a 'build plate' to produce three-dimensional (3-D) objects having features defined by the model. AM techniques are capable of printing complex components using a wide variety of materials. A 3-D object is fabricated based on a computer aided design (CAD) model. The AM process can create a solid three-dimensional object using the CAD model.

Powder Bed Fusion (PBF) is an AM process that uses a laser to sinter or melt powder deposited in a powder bed, which then bonds the powder particles together in targeted areas to produce a 3-D structure having the desired geometry. Different materials or combinations of material, such as metals, engineering plastics, thermoplastic elastomers, metals, and ceramics may be used in PBF to create the 3-D object. Other more advanced AM techniques, including those discussed further below, are also available or under current development, and each may be applicable to the teachings herein.

As AM processes continue to improve, manufacturers are increasingly investigating the benefits of using AM components in their designs. Despite recent advances in AM characteristics like build plate size, print speed and precision, and other progressively more sophisticated features of AM-based technology, the use of AM in the various industries has, for the most part, remained limited to producing relatively small-scale components. These limitations include the inability to remove processing byproducts, such as contaminated gases, over large build areas. Thus, the potential for using AM to develop larger and increasingly sophisticated structures remains largely untapped.

SUMMARY

Several aspects of techniques for gas exchange within an apparatus for producing a 3D structure will be described more fully hereinafter with reference to three-dimensional printing techniques.

Aspects of an apparatus for producing a 3D structure are described, where the apparatus includes a build chamber, one or more radiative energy sources configured to generate two different envelopes of radiative energy that overlap in an overlap region within the build chamber, and one or more manifolds disposed within the build chamber and proximate to the overlap region. The one or more manifolds are configured to perform a gas exchange within the build chamber.

Aspects of a method for producing a 3D structure are described, where the method includes enabling one or more manifolds disposed within a build chamber, the build chamber having a top portion with multiple windows through which radiative energy from one or more energy sources is provided to produce the 3D structure, wherein each manifold is positioned above a region where envelopes of radiative energy from the one or more sources overlap, and performing, by the one or more manifolds, a gas exchange within the build chamber.

Aspects of an apparatus for producing a 3D structure are described, where the apparatus includes a build chamber for producing the 3D structure, one or more radiative energy sources configured to provide radiative energy into the build chamber, and multiple manifolds disposed within the build chamber. The manifolds are configured to perform a gas exchange within the build chamber, and the manifolds are positioned adjacent to a top portion of the build chamber during a first mode of operation and positioned away from the top portion of the build chamber during a second mode of operation.

Aspects of a method for producing a 3D structure are described, where the method includes enabling a first mode of operation for producing the 3D structure in a build chamber, wherein multiple manifolds are disposed within the build chamber in a first position adjacent a top portion of the build chamber during the first mode of operation, enabling a second mode of operation for producing the 3D structure in the build chamber, moving the manifolds to a second position away from the top portion of the build chamber during the second mode of operation, and performing, by the manifolds while in the second position, a gas exchange within the build chamber.

Aspects of an apparatus for producing a 3D structure are described, where the apparatus includes a build chamber for producing the 3D structure, one or more radiative energy sources configured to generate two different envelopes of radiative energy that overlap in an overlap region within the build chamber, and multiple manifolds disposed within the build chamber. The manifolds are configured to perform a gas exchange within the build chamber, and the manifolds are positioned adjacent to a top portion of the build chamber during a first mode of operation and positioned away from the top portion of the build chamber and proximate to the overlap region during a second mode of operation.

It will be understood that other aspects of gas exchange within an additive manufacturing apparatus will become readily apparent to those skilled in the art from the following detailed description, wherein it is shown and described only several embodiments by way of illustration. As will be realized by those skilled in the art, the additively manufacturing transport structures are capable of other and different embodiments and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various aspects of the methods and apparatuses for gas exchange within an apparatus for producing a 3D structure will now be presented in the detailed description by way of example, and not by way of limitation, in the accompanying drawings, wherein:

FIGS. 6A-6D illustrate conceptual side views of a PBF system operation using grid-like plenums for gas exchange over print areas in accordance with aspects of this disclosure.

DETAILED DESCRIPTION

Figure 1A:
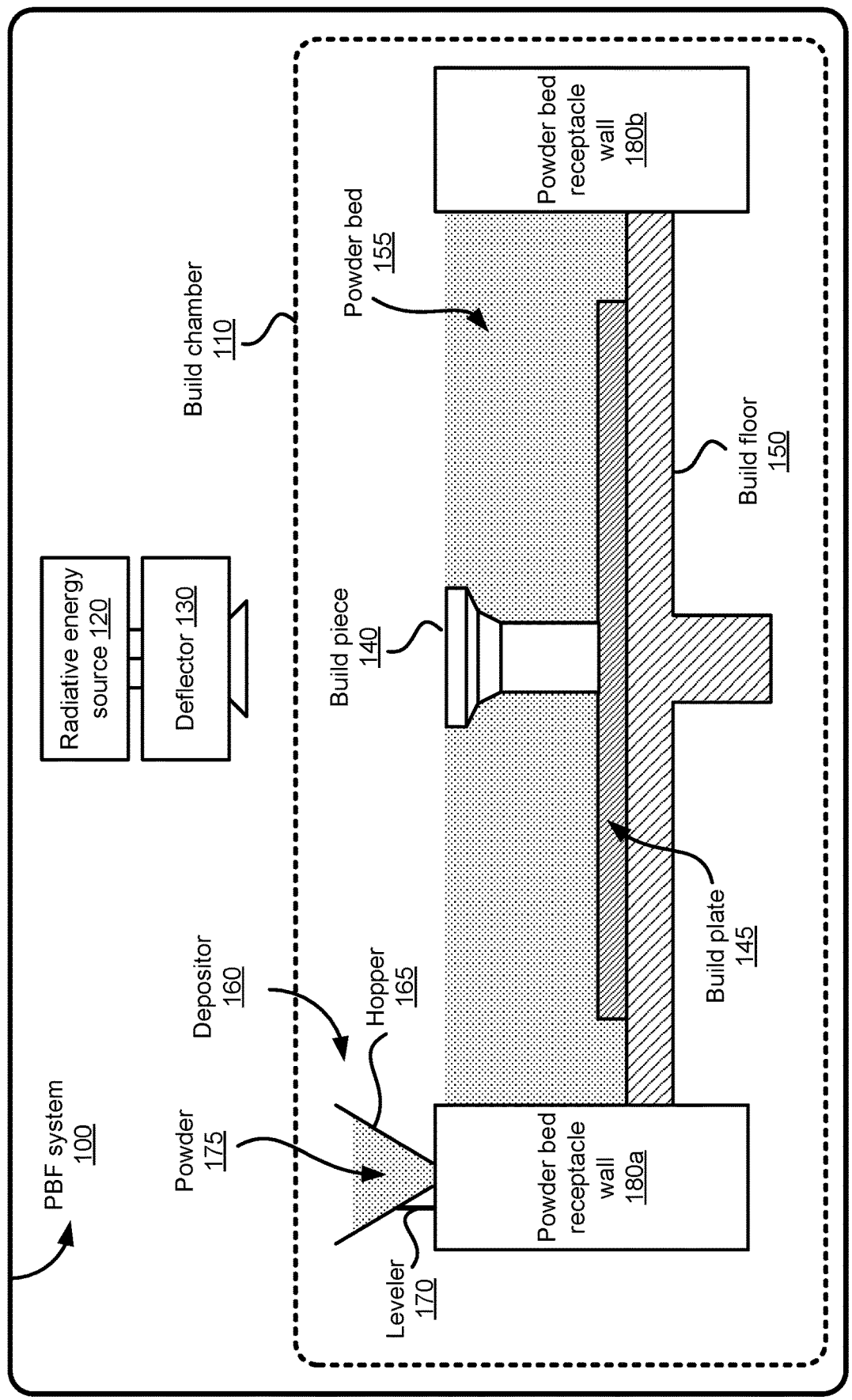
FIGS. 1A-1D illustrate a conceptual side view of an example of a powder bed fusion (PBF) system during different stages of operation.

The detailed description set forth below in connection with the appended drawings is intended to provide a description of various exemplary embodiments of additively manufacturing transport structures and is not intended to represent the only embodiments in which the invention may be practiced. The terms "example" and "exemplary" used throughout this disclosure mean "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

This disclosure is generally directed to additive manufacturing techniques that may be used to produce different types of structures, where large build chambers may be needed and where the removal of processing byproducts such as contaminated gases may take place over large areas. In some instances, these techniques may be used in, for example, the modular assembly of vehicles and other transport structures. In an exemplary aspect of the disclosure, certain components of such transport structures can represent modular components. As shown below, the combination of the additive manufacturing techniques with enhancements to the way in which processing byproducts are removed may provide advantages to the production of different types of large structures. In addition, such techniques can provide distinct advantages to a user. These points are addressed in greater detail below.

Manufacturers that stand to benefit from this proposed combination of features include, but are not limited to, those that manufacture virtually any mechanized form of transport, which often rely heavily on complex and labor intensive machine tools and molding techniques, and whose products often require the development of complex panels, nodes, and interconnects to be integrated with intricate machinery such as combustion engines, transmissions and increasingly sophisticated electronic techniques. Examples of such transport structures include, among others, trucks, trains, boats, aircraft, tractors, motorcycles, buses, trains, and the like. These transport structures tend to be larger than other types of structures manufactured using additive manufacturing techniques and therefore may require enhanced manufacturing equipment and processing techniques.

Additive Manufacturing (3-D Printing).

A variety of different AM techniques have been used to 3-D print components composed of various types of materials. Numerous available techniques exist, and more are being developed. For example, Directed Energy Deposition (DED) AM systems use directed energy sourced from laser or electron beams to melt metal. These systems utilize both powder and wire feeds. The wire feed systems advantageously have higher deposition rates than other prominent AM techniques. Single Pass Jetting (SPJ) is another exemplary technology claimed by its developers to be much quicker than conventional laser-based systems. SPJ combines two powder spreaders and a single print unit to spread metal powder and to print a structure in a single pass with apparently no wasted motion. As another illustration, electron beam additive manufacturing processes use an electron beam to deposit metal via wire feedstock or sintering on a powder bed in a vacuum chamber. Atomic Diffusion Additive Manufacturing (ADAM) is still another recently developed technology in which components are printed, layer-by-layer, using a metal powder in a plastic binder. After printing, plastic binders are removed and the entire part is sintered at once into a desired metal.

Another AM technique includes PBF. Like DED, PBF creates 'build pieces' layer-by-layer. Each layer or 'slice' is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up.

FIGS. 1A-1D illustrate respective side views of an exemplary PBF system 100 during different stages of operation. The particular embodiment illustrated in FIGS. 1A-1D is one of many suitable examples of a PBF system employing principles of this disclosure. It should also be noted that elements of FIGS. 1A-1D and the other figures in this disclosure are not necessarily drawn to scale, but may be drawn larger or smaller for the purpose of better illustration of concepts described herein.

PBF system 100 can include a depositor 160 that can deposit each layer of metal powder, a radiative energy source 120 that can generate one or more energy beams, a deflector 130 that can apply the energy beam(s) to fuse the powder, and a build plate 145 that can support one or more build pieces, such as a build piece 140. The PBF system can also include a build floor 150 positioned within a powder bed receptacle. Walls 180a and 180b of a powder bed receptacle generally define the boundaries of the powder bed receptacle, which is sandwiched between the walls from the side and abuts a portion of the build floor 150 below. The build floor 150 can progressively lower build plate 145 (see e.g., FIG. 1B) so that depositor 160 can deposit a next layer. The entire mechanism may reside in a build chamber 110 that can enclose the other components, thereby protecting the equipment, enabling atmospheric and temperature regulation and mitigating contamination risks. In some implementations, radiative energy source 120 and/or deflector 130 can be part of or be included within the build chamber 110. Depositor 160 can include a hopper 165 that contains a powder 175, such as a metal powder, and a leveler 170 that can level the top of each layer of deposited powder.

Referring specifically to FIG. 1A, this figure shows PBF system 100 after a slice of build piece 140 has been fused, but before the next layer of powder has been deposited. In fact, FIG. 1A illustrates a time at which the PBF system has already deposited and fused slices in multiple layers to form the current state of build piece 140. The multiple layers already deposited have created a powder bed 155, which includes powder that was deposited but not fused.

Figure 1B:
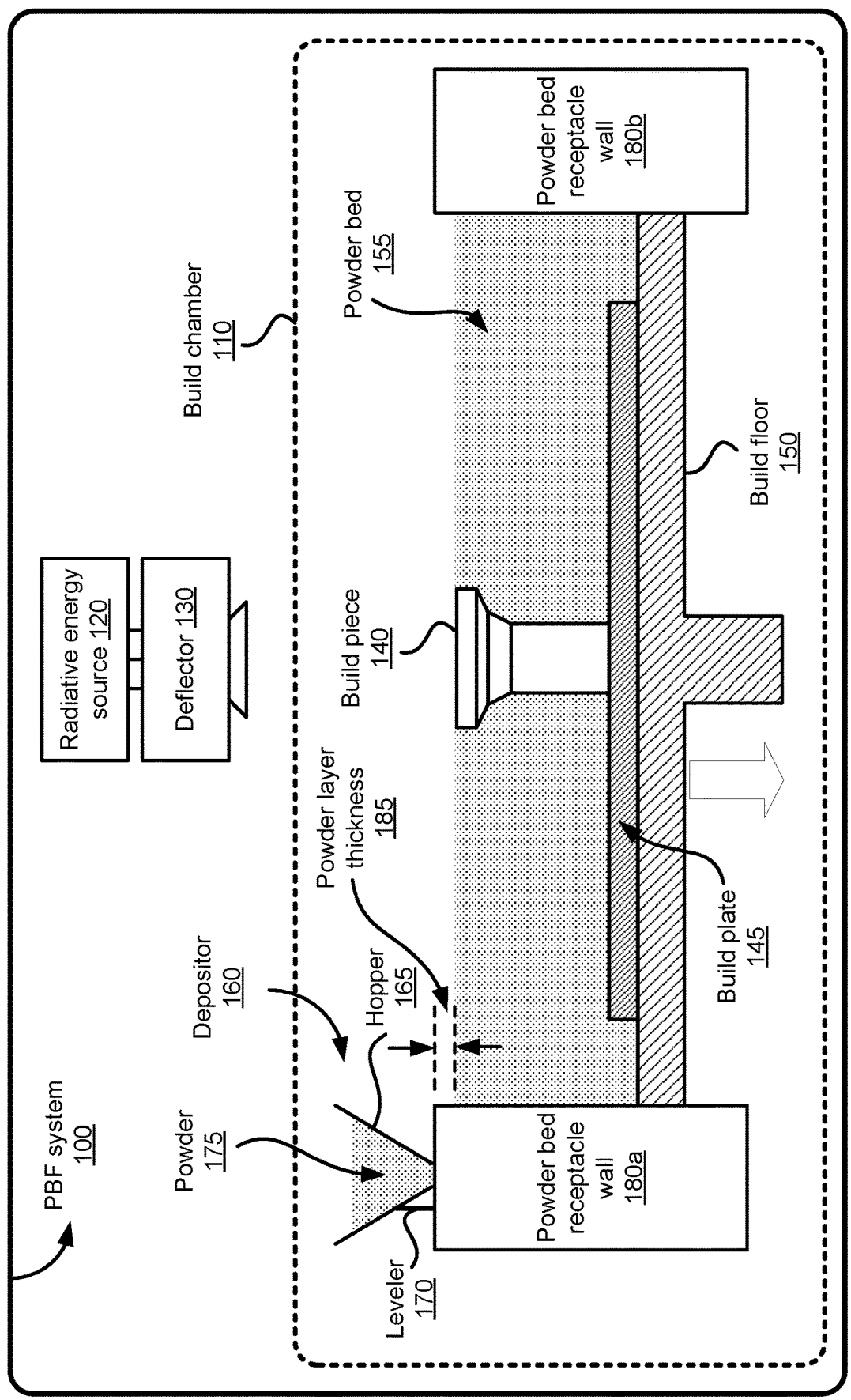

FIG. 1B shows PBF system 100 at a stage in which build floor 150 can be lowered by a powder layer thickness 185. The lowering of the build floor causes build piece 140 and powder bed 155 to drop by the same powder layer thickness 185, so that the top of build piece 140 and of powder bed 155 are lower than the top of powder bed receptacle walls 180a and 180b by an amount equal to powder layer thickness 185. In this way, for example, a space with a consistent thickness equal to the powder layer thickness can be created over the tops of build piece 140 and powder bed 155.

Figure 1C:
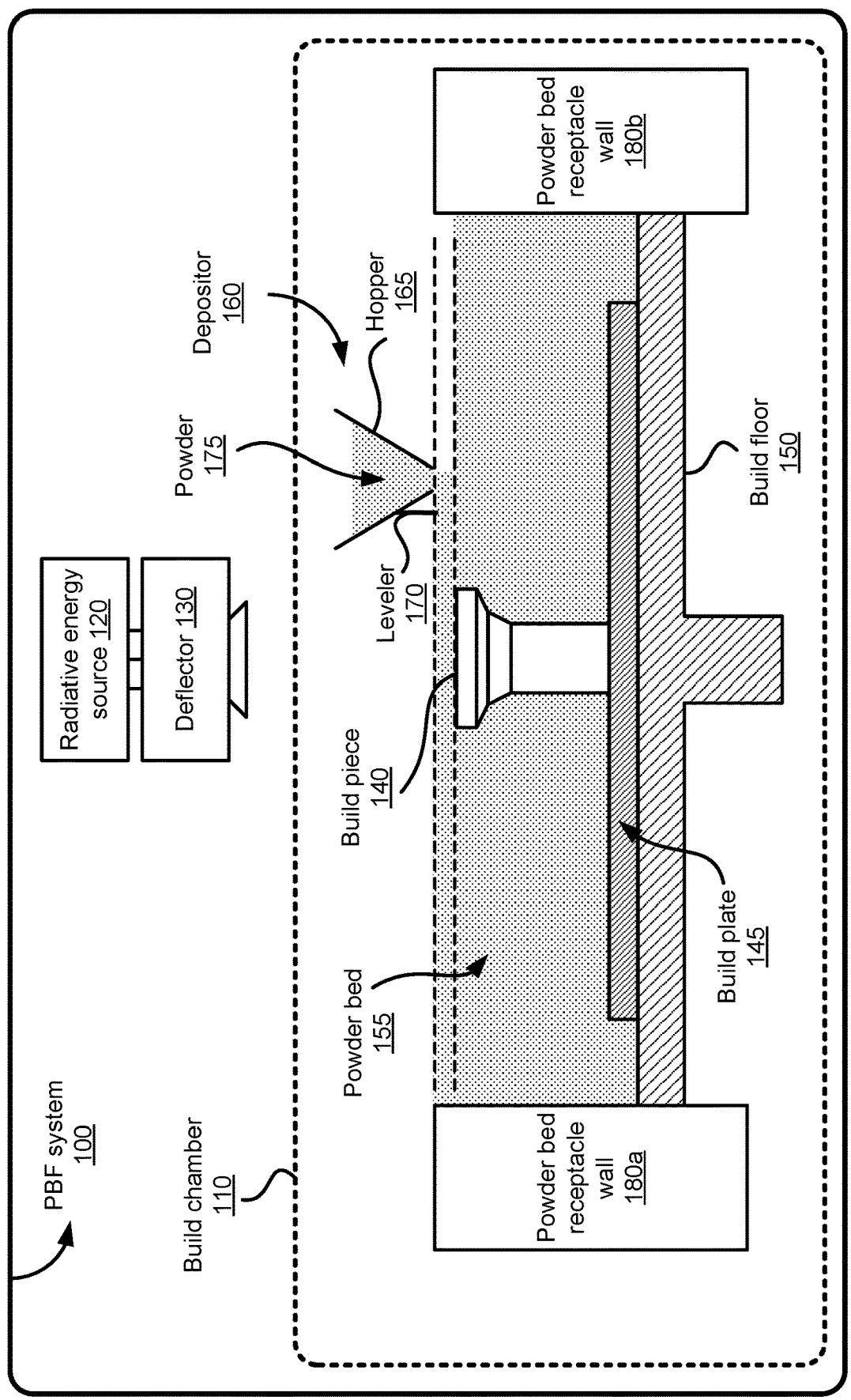

FIG. 1C shows PBF system 100 at a stage in which depositor 160 is positioned to deposit powder 175 in a space created over the top surfaces of build piece 140 and powder bed 155 and bounded by powder bed receptacle walls 180a and 180b. In this example, depositor 160 progressively moves over the defined space while releasing the powder from the hopper 165. Leveler 170 can level the released powder to form a powder layer that has a thickness substantially equal to powder layer thickness 185 (see e.g., FIG. 1B). Thus, the powder in the PBF system can be supported by a powder support structure, which can include, for example, build plate 145, build floor 150, build piece 140, powder bed receptacle walls 180a and 180b, and the like. It should be noted that as illustrated powder layer thickness 185 can be greater than an actual thickness used for the example involving previously-deposited layers discussed above with reference to FIG. 1A. In other words, the powder layer thickness can be different for different layers.

Figure 1D:
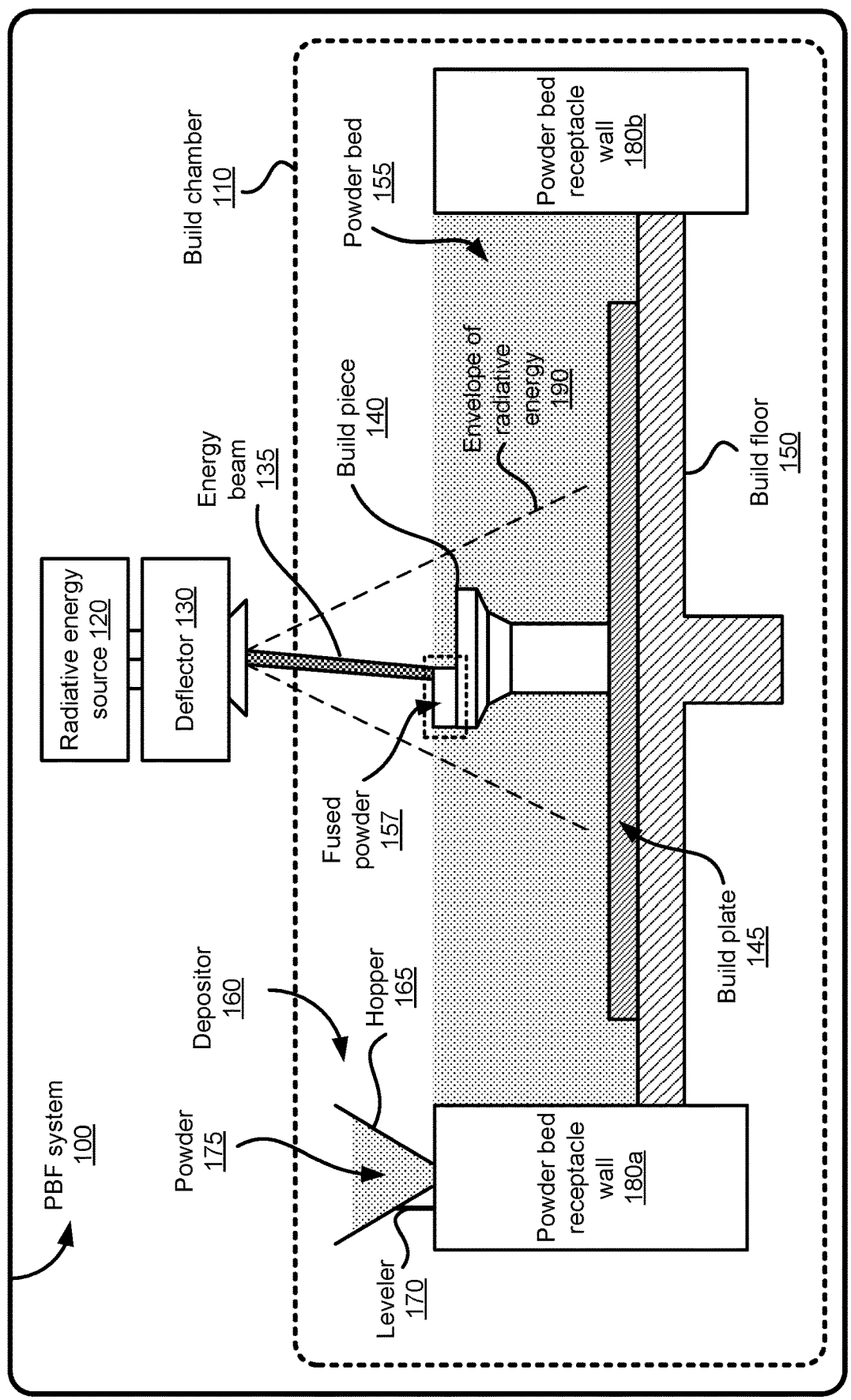

FIG. 1D shows PBF system 100 at a stage in which, following the deposition of a powder layer having powder layer thickness 185 (FIG. 1C), radiative energy source 120 generates an energy beam 135 and deflector 130 applies the energy beam to fuse the next slice in build piece 140 (e.g., fused powder 157). In various exemplary embodiments, radiative energy source 120 can be an electron beam source, in which case energy beam 135 constitutes an electron beam. The deflector can include deflection plates that can generate an electric field or a magnetic field that selectively deflects the electron beam to cause the electron beam to scan across areas designated to be fused. In various embodiments, radiative energy source 120 can be a laser, in which case energy beam 135 is a laser beam. The deflector can include an optical system that uses reflection and/or refraction to manipulate the laser beam to scan selected areas to be fused. In either case, energy beam 135 may have an associated envelope of radiative energy 190 that represents a potential coverage of the energy beam or a spread of the energy associated with the energy beam.

In various embodiments, deflector 130 can include one or more gimbals and actuators that can rotate and/or translate radiative energy source 120 to position energy beam 135. In various embodiments, the radiative energy source and/or the deflector can modulate the energy beam, e.g., turn energy beam 135 on and off as the deflector scans so that the energy beam is applied only in the appropriate areas of the powder layer. For example, in various embodiments, the energy beam can be modulated by using signals generated by a digital signal processor (DSP) or other similar signal generating devices or components.

As mentioned above, despite recent advances in AM characteristics like build plate size, print speed and precision, and other progressively more sophisticated features of AM-based technology, the use of AM in the various industries has, for the most part, remained limited to producing relatively small-scale components. These limitations include the inability to remove processing byproducts, such as contaminated gases, over large build areas. Below are described implementations that use different configurations of manifolds to perform gas exchange over large build areas to remove unwanted byproducts resulting from the fusion of power (e.g., powder 175) when building a next slice in build piece 140.

Figure 2A:
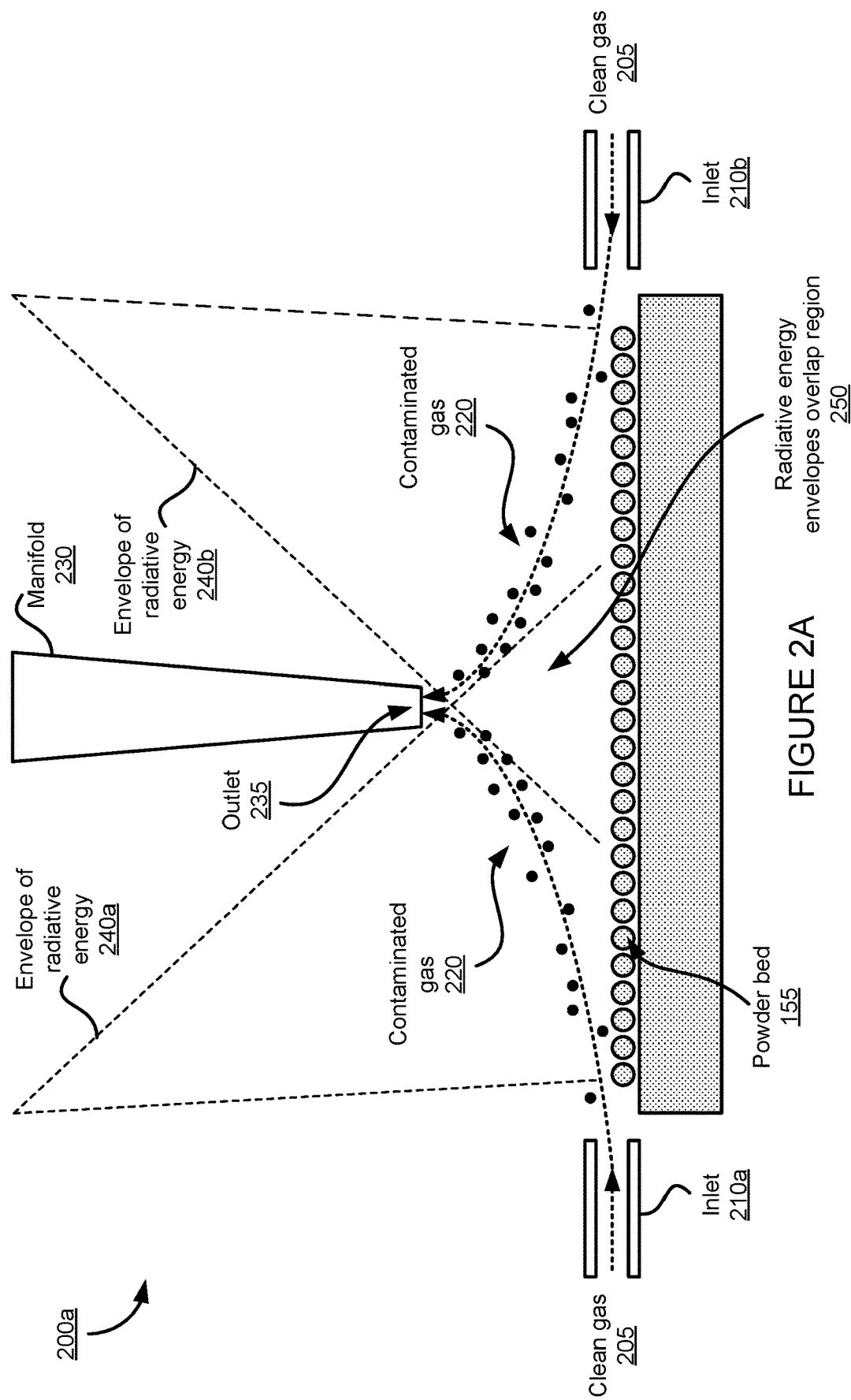
FIGS. 2A-2C illustrate various examples of configurations within a PBF system that uses manifolds for gas exchanges that enable laser avoidance in accordance with aspects of this disclosure.
Figure 2B:
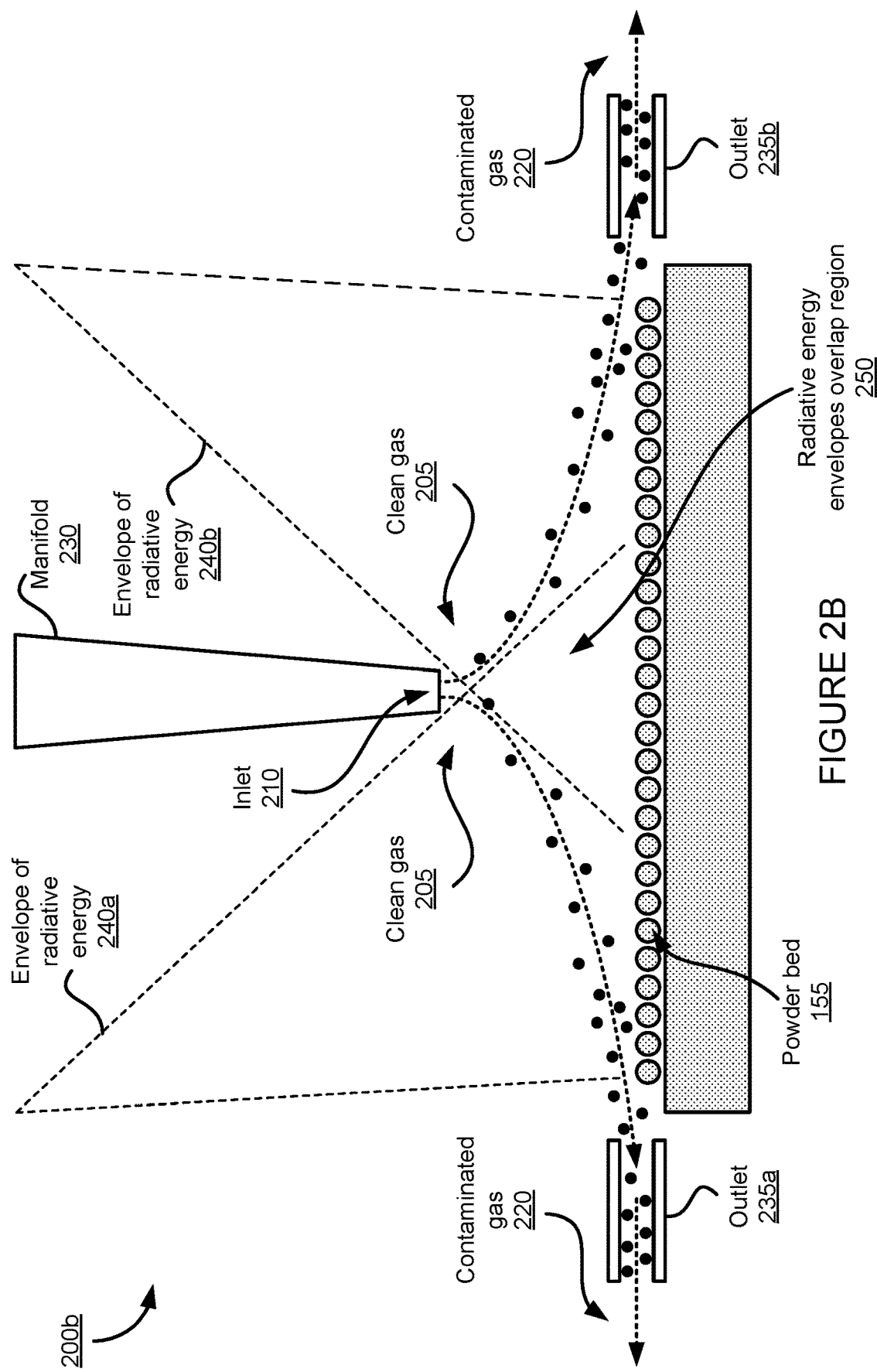
Figure 2C:
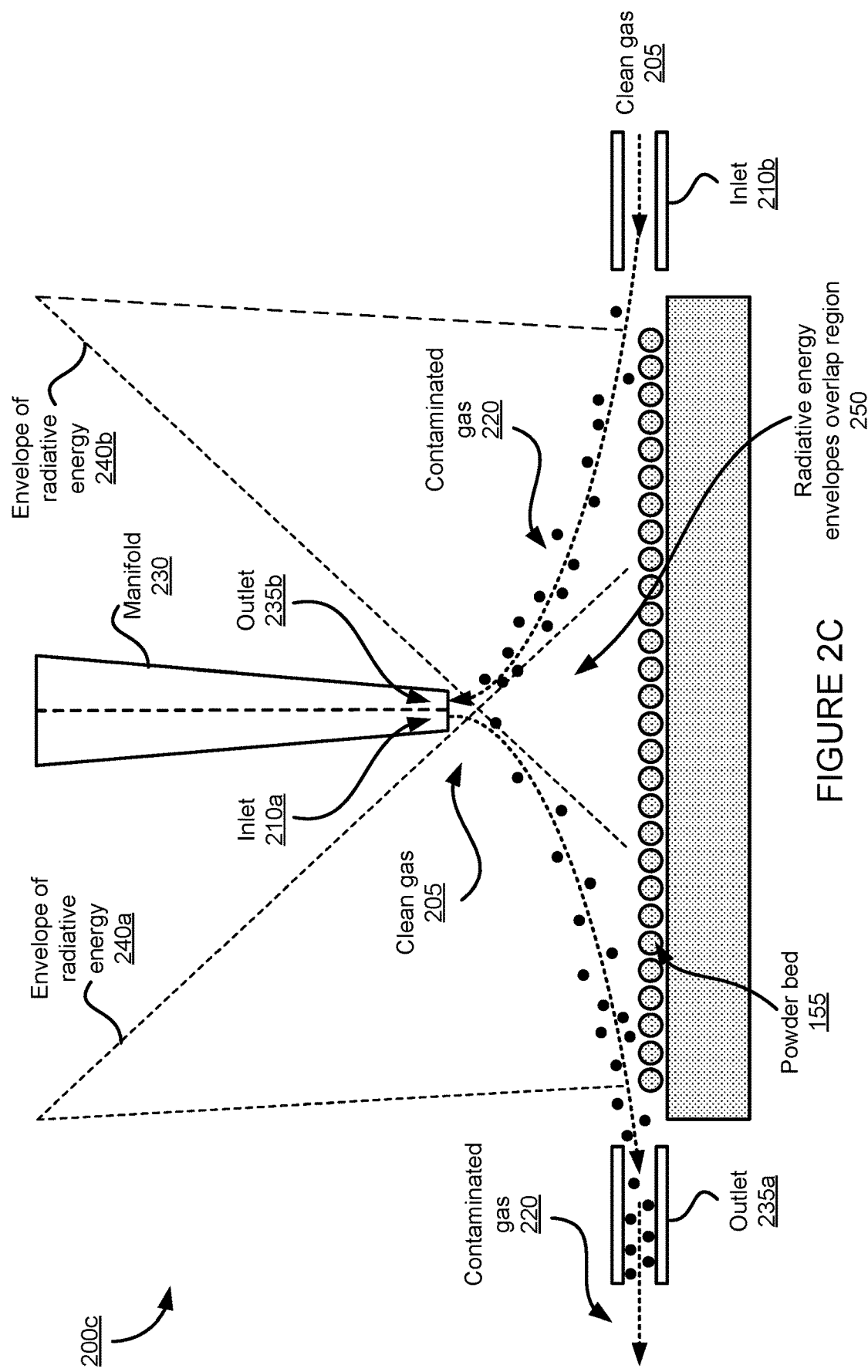

FIGS. 2A-2C illustrate various examples of configurations within a PBF system (such as PBF system 100) that uses manifolds for gas exchanges that enable laser avoidance in accordance with aspects of this disclosure. In a diagram 200a in FIG. 2A there is shown contaminated gas 220 containing soot that results from the build process inside a build chamber (e.g., build chamber 110 in FIGS. 1A-1D). The contaminated gas that results from a fusing (or fusion) operation is to be removed to avoid having unwanted particles or materials present in the powder that is to be fused in a subsequent fusing operation.

The example shown in FIG. 2A illustrates a partial side view of a PBF system in which a manifold 230 is positioned between a first envelope of radiative energy 240a associated with a first source (e.g., envelope of an electron beam or laser beam) and a second envelope of radiative energy 240b (e.g., envelope of an electron beam or a laser beam). The manifold is positioned above a region where the two envelopes overlap, which is referred to as a radiative energy envelopes overlap region 250 in the diagram 200a. The positioning of the manifold above the radiative energy envelopes overlap region allows for the fusing of powder in powder bed 155 without interference from the manifold on the areas covered by either first envelope of radiative energy 240a or second envelope of radiative energy 240b. In this way, it is possible to have manifold 230 positioned near powder bed 155 to remove contaminated gas 220 while avoiding the electron or laser beams being used for powder fusion.

In this example, after a fusing operation that results in contaminated gas 220 remaining near the surface of powder bed 155, clean gas 205 may be provided into build chamber 110 through the sides using inlets 210a and 210b (although more or fewer inlets may be used). The position of each of inlets 210a and 210b is provided by way of illustration and each of the inlets may be placed in a different position than the one shown. The clean gas that enters the build chamber is used to move or push the contaminated gas to an outlet 235 in a bottom portion of manifold 230 and out of build chamber 110. In some implementations, manifold 230 may include multiple outlets 235. The contaminated gas 220 may then be taken to be further processed or disposed.

Because the diagram 200a in FIG. 2A represents a partial view, the PBF system can include one or more manifolds 230 that operate substantially as described in this example. That is, the PBF system can use one or more manifolds 230 having at least one outlet 235 in the bottom portion.

The example shown in a diagram 200b in FIG. 2B also illustrates a partial side view of a PBF system in which a manifold 230 is positioned between first envelope of radiative energy 240a associated with a first source (e.g., envelope of an electron beam or laser beam) and second envelope of radiative energy 240b (e.g., envelope of an electron beam or a laser beam). Again, manifold 230 is positioned above the region where the two envelopes overlap (e.g., radiative energy envelopes overlap region 250).

In this example, after a fusing operation that results in contaminated gas 220 remaining near the surface of powder bed 155, clean gas 205 may be provided into the build chamber 110 through an inlet 210 in the bottom portion of the manifold 230 (although more inlets may be used). The clean gas that enters build chamber 110 is used to move or push contaminated gas 220 to outlets 235a and 235b through a side of build chamber 110. The position of each of outlets 235a and 235b is provided by way of illustration and each of the outlets may be placed in a different position than the one shown. The contaminated gas may then be taken to be further processed or disposed.

Because diagram 200b in FIG. 2B represents a partial view, the PBF system can include one or more manifolds 230 that operate substantially as described in this example. That is, the PBF system can use one or more manifolds 230 having at least one inlet 210 in the bottom portion.

In the example shown in a diagram 200c in FIG. 2C, a partial side view of a PBF system is illustrated in which a manifold 230 is positioned between first envelope of radiative energy 240a and second envelope of radiative energy 240b. Again, manifold 230 is positioned above the region where the two envelopes overlap (e.g., radiative energy envelopes overlap region 250).

In this example, after a fusing operation that results in contaminated gas 220 remaining near the surface of powder bed 155, clean gas 205 may be provided into build chamber 110 through an inlet 210a in the bottom portion of the manifold 230 (although more inlets may be used) and through an inlet 210b on a side of build chamber 110. The clean gas that enters build chamber 110 is used to move or push contaminated gas 220 to outlet 235a through a side of the build chamber 110 and an outlet 235b on the bottom portion of manifold 230. The position of each of inlet 210b and outlet 235a is provided by way of illustration and each of inlet 210b and outlet 235a may be placed in a different position than the one shown. Once out of build chamber 110, contaminated gas 220 may then be taken to be further processed or disposed.

Because diagram 200c in FIG. 2C represents a partial view, the PBF system can include one or more manifolds 230 that operate substantially as described in this example. That is, the PBF system can use one or more manifolds 230 having at least one inlet 210 and one outlet 235 in the bottom portion.

Figure 3A:
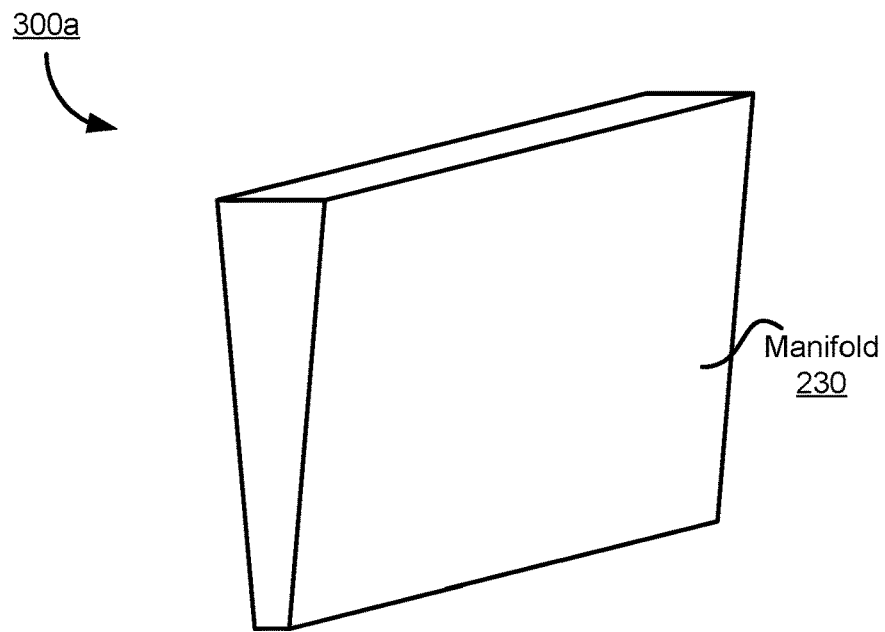
FIGS. 3A and 3B illustrate examples of manifolds for gas exchanges that enable laser avoidance in accordance with aspects of this disclosure.
Figure 3B:
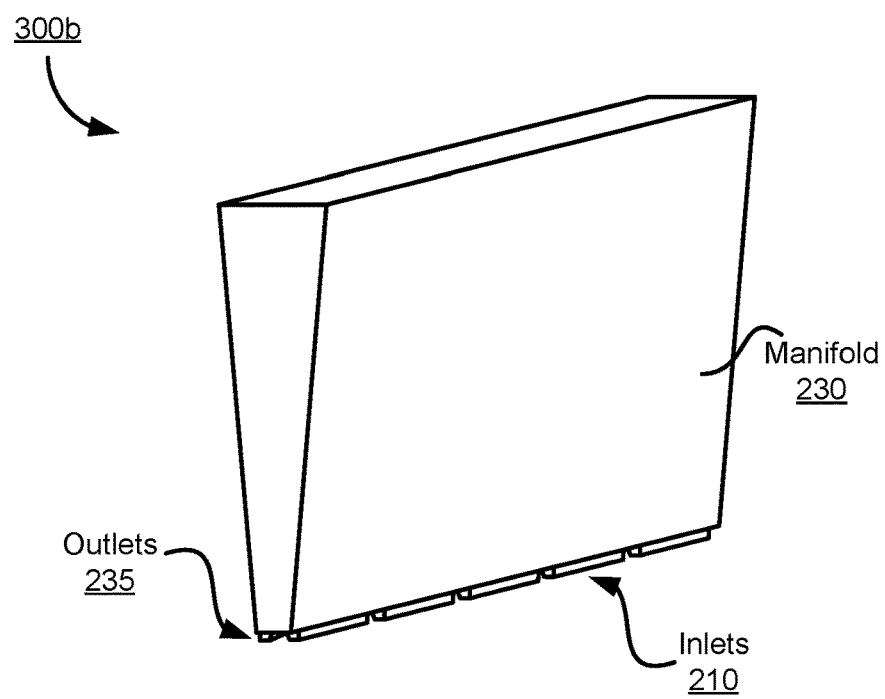

The examples described in FIGS. 2A-2C show different configurations of the manifold 230, one where it is used to extract, retrieve, or collect the contaminated gas 220 (FIG. 2A), one where it is used to provide the clean gas 205 (FIG. 2B), and one where it is configured to do both. FIGS. 3A and 3B illustrate more detailed examples of these different manifold configurations. For example, a diagram 300a in FIG. 3A shows a perspective view of manifold 230 having a tapered shape with the upper or top portion being wider than the lower or bottom portion. In this configuration, manifold 230 may be used to extract contaminated gas 220 (FIG. 2A) from the build chamber 110 with one or more outlets (e.g., outlets 235) in the bottom portion or to provide clean gas 205 (FIG. 2B) to build chamber 110 with one or more inlets (e.g., inlets 210) in the bottom portion.

A diagram 300b in FIG. 3B shows a perspective view of manifold 230 having a similar tapered shape as in FIG. 3A. In this configuration, manifold 230 may be used to both extract contaminated gas 220 (FIG. 2A and FIG. 2C) with one or more outlets (e.g., outlets 235) in the bottom portion and provide clean gas 205 (FIG. 2B and FIG. 2C) with one or more inlets (e.g., inlets 210) in the bottom portion.

While manifold 230 in the diagrams 300a and 300b is shown with a tapered shape, other shapes may also be used. Moreover, manifold 230 is shown as a single structure, however, it can be implemented as multiple, separate structures, each configured to extract a portion of contaminated gas 220, provide a portion of the clean gas 205, or do both.

Figure 4:
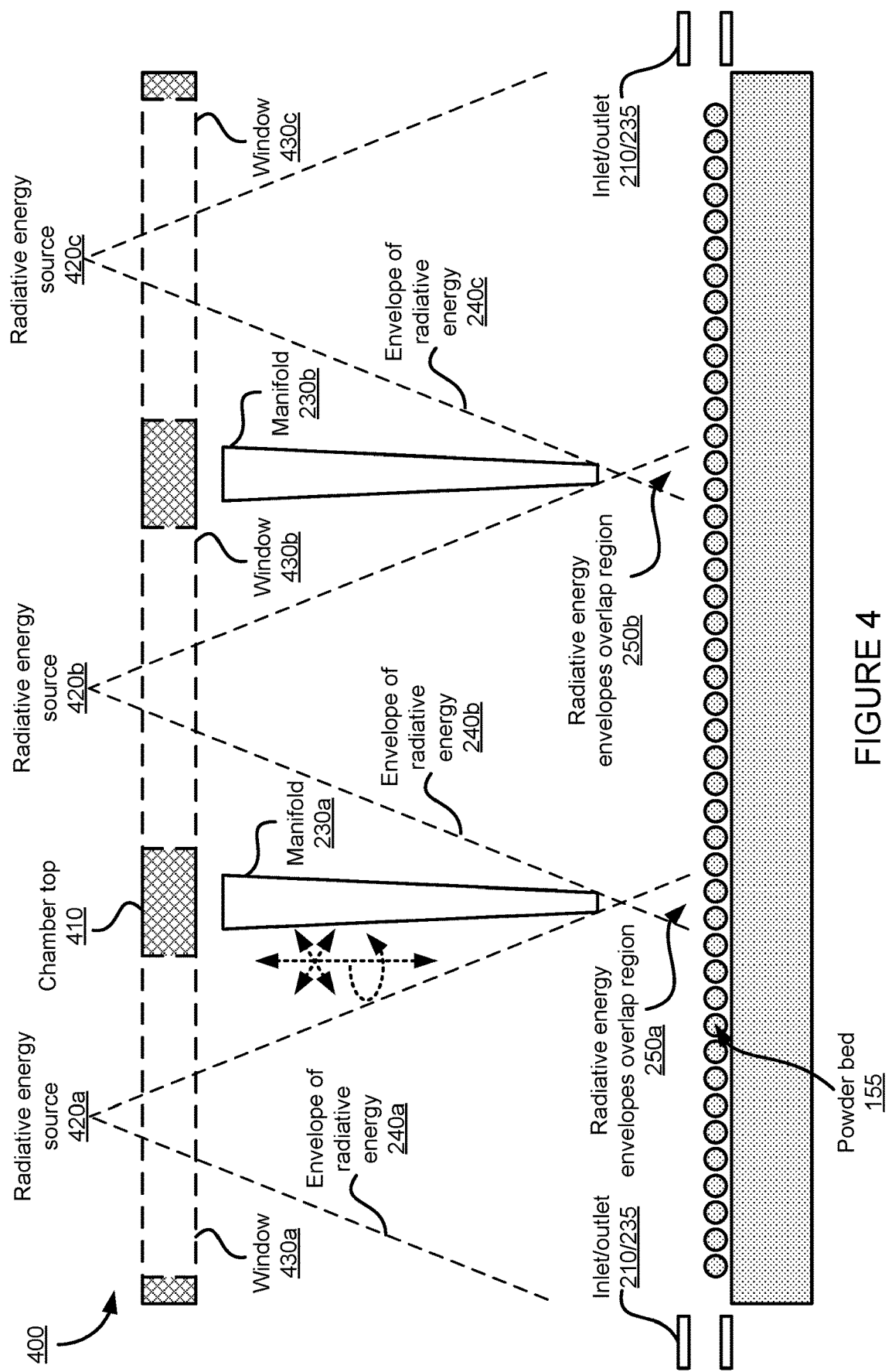
FIG. 4 illustrates a conceptual side view of part of a build chamber with multiple manifolds for gas exchange that enable laser avoidance in accordance with aspects of this disclosure.

FIG. 4 shows a diagram 400 that illustrates a partial side view of a build chamber with multiple manifolds for gas exchange. For a build chamber to be configured to fabricate larger build pieces (e.g., build piece 140), multiple radiative energy sources (e.g., electron or laser sources) may be used to fuse powder over a much larger build area that can be done with a single source. When multiple sources are used for a large area build operation, multiple manifolds may also be needed to effectively remove the soot generated over such a large area as a byproduct of the build operation. These manifolds need to be placed or positioned in such a way that they do not interfere with the radiative energy (e.g., electron or laser beams) generated by sources and provided into the build chamber to fuse the powder. Therefore, to avoid interfering with the electron or laser beams, the manifolds may be positioned inside the build chamber between envelopes of radiative energy and above where these envelopes overlap, as illustrated in diagram 400.

In the example shown in diagram 400, build chamber 110 described above in connection with FIGS. 1A-1D can include an upper portion or build chamber top portion, also referred to as a chamber top 410. The chamber top can have more than one window through which radiative energy (e.g., in the form of an electron or laser beam) is provided into build chamber 110 to fuse powder to add to the build piece 140. For example, chamber top 410 can include windows 430a, 430b, and 430c, through which sources 420a, 420b, and 420c can respectively radiate beams (e.g., electron or laser beams) into build chamber 110. Each of sources 420a, 420b, and 420c has a respective envelope that covers a specific area of powder bed 155, and the combination of these areas provides for a large overall area for the fusing operation. For example, radiative energy source 420a has a corresponding envelope of radiative energy 240a that covers approximately a left third of the area of powder bed 155 and can be used to fuse powder over this area. Radiative energy source 420b has a corresponding envelope of radiative energy 240b that covers approximately a middle third of the area of powder bed 155 and can be used to fuse powder over this area. Radiative energy source 420c has a corresponding envelope of radiative energy 240c that covers approximately a right third of the area of powder bed 155 and can be used to fuse powder over this area. Envelope 240a may overlap with envelope 240b in an overlap region 250a (e.g., radiative energy envelopes overlap region 250a) and envelope 240b may overlap with envelope 240c in an overlap region 250b (e.g., radiative energy envelopes overlap region 250b).

In this example, manifolds 230a and 230b are positioned above overlap regions 250a and 250b, respectively, to avoid interference with the beams associated with envelopes 240a, 240b, and 240c. Manifolds 230a and 230b along with the inlets/outlets 210/235 can be used to remove contaminated gas from the build chamber 110 after a fusing operation.

While the example in diagram 400 shows three windows and two manifolds as part of the overall architecture of build chamber 110, it is to be understood that this example is provided for illustrative purposes and a greater number of windows and manifolds may be used to increase the effective build area and, consequently, the size of the 3D pieces that can be manufactured or fabricated using build chamber 110.

In one implementation associated with diagram 400, the manifolds can move in synchronization with the beams provided by one or more of sources 420a, 420b, and 420c to perform localized removal of contaminated gas while the beams perform, for example, a fusing operation. The manifolds may be moved along a vertical direction, one or more horizontal directions, a rotational direction, or a combination thereof as illustrated by the arrows in diagram 400. This movement may be used to synchronize the manifolds with the electron or laser beams from the sources and/or to better control their position to remove contaminated gas and/or to provide clean gas.

In summary, FIGS. 1A-4 describe various aspects of an apparatus and a method for producing 3D structures or pieces. FIGS. 1A-1D illustrate an example of a PBF system that may also be used to produce 3D structures or pieces. FIGS. 2A-4 illustrate example configurations and further details of those configurations in accordance with the systems and methods described herein. The example configurations and further details of those configurations illustrated in FIGS. 2A-4 may be applied to a PBF system such as the PBF system of FIGS. 1A-1D or other PBF systems. Accordingly, the apparatus can include a build chamber (e.g., build chamber 110) having a top portion (e.g., chamber top 410) with multiple windows (e.g., windows 430a, 430b, and 430c) through which radiative energy from different sources (e.g., sources 420a, 420b, and 420c) is provided to the build chamber to produce the 3D structure. As shown in the diagram 400 in FIG. 4, the one or more manifolds are disposed within the build chamber and are configured to perform a gas exchange within the build chamber (see e.g., FIGS. 2A-2C and FIGS. 3A and 3B). Moreover, each manifold is further configured to be positioned above a region where envelopes of radiative energy from at least two different sources overlap (see e.g., manifolds 230a and 230b in diagram 400 positioned over overlap regions 250a and 250b, respectively). The different sources can be laser sources (or electron beam sources) and the envelopes of radiative energy of the laser sources correspond to envelopes produced by orienting beams (e.g., laser or optical beams) generated by the laser sources.

In one implementation, the apparatus can include a gas inlet (e.g., gas inlet 210 of the build chamber) configured to introduce into the build chamber, as part of the gas exchange, clean gas (e.g., clean gas 205). In such implementation, each manifold can be further configured include a gas outlet (e.g., gas outlet 235) to remove from the build chamber, as part of the gas exchange, contaminated gas (e.g., contaminated gas 220) containing soot resulting from producing the 3D structure. An example of such implementation is illustrated in connection with the diagram 200a in FIG. 2A.

In another implementation, the apparatus can include a gas outlet (e.g., gas outlet 235 of the build chamber) configured to remove from the build chamber, as part of the gas exchange, contaminated gas (e.g., contaminated gas 220) containing soot resulting from producing the 3D structure. In such implementation, each manifold can be further configured to include a gas inlet (e.g., gas inlet 210) to introduce into the build chamber, as part of the gas exchange, clean gas (e.g., clean gas 205). An example of such implementation is illustrated in connection with the diagram 200b in FIG. 2B.

In yet another implementation, the apparatus can include a gas outlet (e.g., gas outlet 235 of the build chamber) configured to remove from the build chamber, as part of the gas exchange, contaminated gas (e.g., contaminated gas 220) containing soot resulting from producing the 3D structure and a gas inlet (e.g., gas inlet 210 of the build chamber) configured to introduce into the build chamber, as part of the gas exchange, clean gas (e.g., clean gas 205). In such implementation, each manifold is further configured to include a gas outlet (e.g., gas outlet 235) configured to remove from the build chamber, as part of the gas exchange, contaminated gas (e.g., contaminated gas 220) and a gas inlet configured to introduce into the build chamber, as part of the gas exchange, clean gas (e.g., clean gas 205). An example of such implementation is illustrated in connection with the diagram 200c in FIG. 2C.

These implementation need not be limiting and other implementations can be used that combine some of the features of these implementations. For example, in another implementation, different types of manifolds may be used within the same build chamber, where one type of manifold is used to provide clean gas, another type of manifold is used to remove contaminated gas, and yet another type of manifold is used to do both, provide clean gas and remove contaminated gas.

In another aspect of the apparatus described in connection with FIGS. 2A-4, each manifold can include an elongated structure (e.g., tapered structure) vertically positioned within the build chamber and having at least one gas inlet, at least one gas outlet, or both at one end of the elongated structure that is near a region in the build chamber where the 3D structure is produced (see e.g., FIGS. 2A-2C and FIGS. 3A and 3B).

The one or more manifolds in the build chamber can include multiple manifolds separately disposed along a length of the build chamber such that each manifold performs the gas exchange for a different region or area of the build chamber. In the example shown in diagram 400 in FIG. 4, the length of the build chamber can in the longitudinal direction from left-to-right or right-to-left in the figure, while the width of the build chamber can be in the transversal direction into or out of the figure. In some instances, the separation between any two consecutive manifolds is the same. There could be other instances, however, where the separation or distance between any two consecutive manifolds along the length of the build chamber can vary or be different and, consequently, the regions or areas in between manifolds can also vary. Moreover, each manifold can be fixed in a predetermined position within the build chamber. There could be other implementations in which the manifolds are configured to be movable and could be moved in one or more directions within the build chamber (e.g., lateral movements in one or more directions (x-y directions), vertical movements (z direction), and/or rotational movements).

As shown in the diagram 400 in FIG. 4, the apparatus can contain multiple windows (e.g., windows 430a, 430b, and 430c) in a top portion, where a number of the windows in the top portion of the build chamber is N and a number of the manifolds is N−1, with N being a positive integer number greater or equal to 2 (N≥2).

In another aspect of the apparatus, the build chamber is a chamber configured for powder bed fusion (PBF) additive manufacturing processes and includes a powder bed (e.g., powder bed 155), and each manifold includes an elongated structure (e.g., tapered structure) vertically positioned within the build chamber and having at least one gas inlet, at least one gas outlet, or both at one end of the elongated structure that is near the power bed (see e.g., diagram 400 in FIG. 4).

In yet another aspect of the apparatus, each manifold is configured to perform the gas exchange during a mode of operation of the build chamber, where the mode of operation is one of a fusing mode (e.g., fusing operation) or a re-coating mode or re-coating operation.

Figure 5:
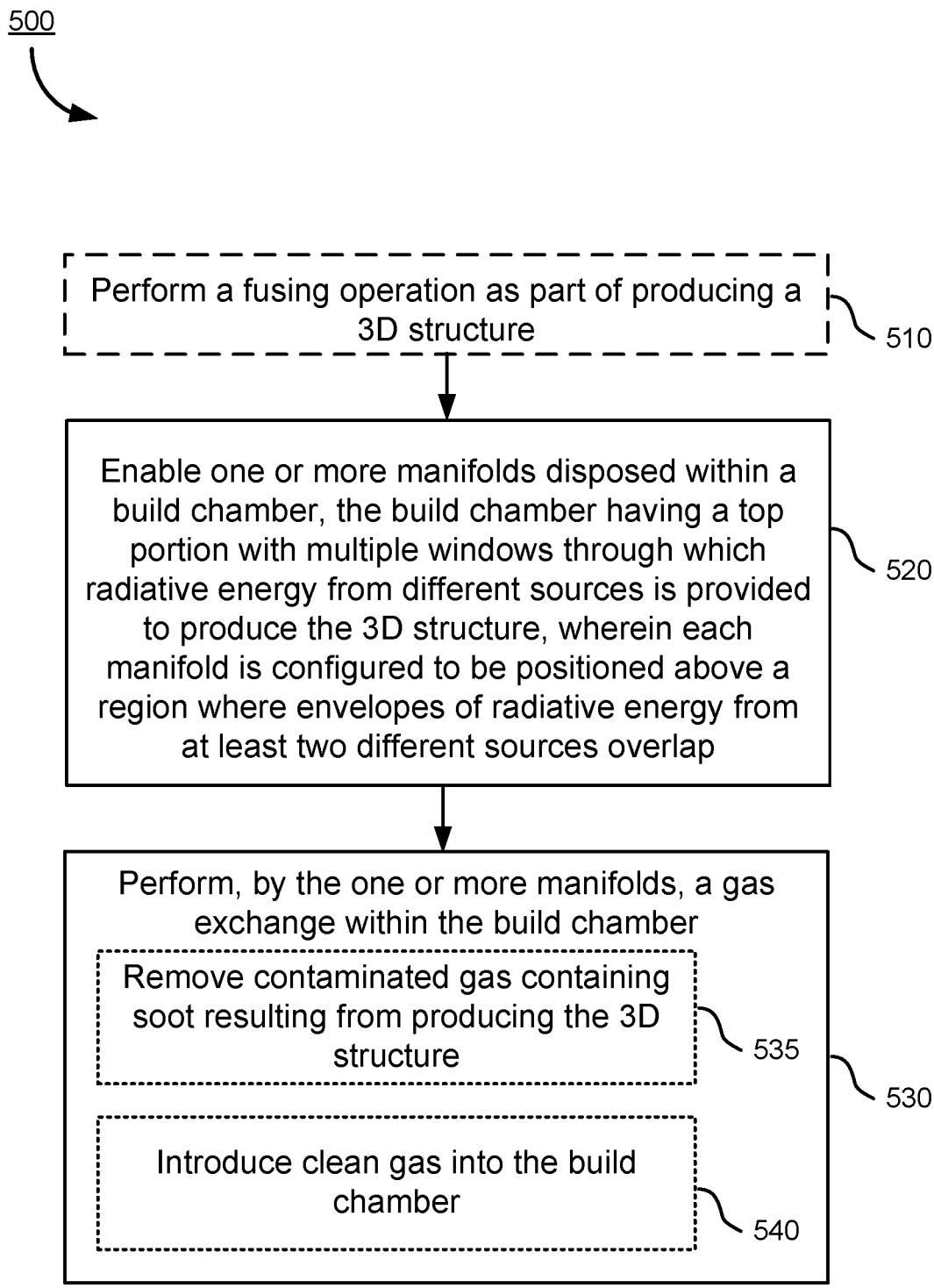
FIG. 5 illustrates a flow diagram of an exemplary method for producing a 3D structure by using manifolds that enable laser avoidance in accordance with aspects of this disclosure.

FIG. 5 illustrates a flow diagram of an exemplary method 500 for producing a 3D structure by using manifolds that enable laser avoidance. The method may be performed based on the apparatus described above in connection with FIGS. 2A-4, e.g., as these examples may be applied to a PBF system such as the PBF system illustrated in FIGS. 1A-1D or other PBF systems.

At block 510, method 500 optionally includes performing a fusing operation (e.g., fusion mode) as part of producing a 3D structure. Additionally or alternatively, a re-coating operation (e.g., re-coating mode) may be performed at block 510.

At block 520, method 500 includes enabling one or more manifolds (e.g., manifolds 230a and 230b) disposed within the build chamber (e.g., build chamber 110), where the build chamber has a top portion (e.g., chamber top 410) with multiple windows (e.g., windows 430a, 430b, and 430c) through which radiative energy from different locations of energy sources (e.g., sources 420a, 420b, and 420c at different locations) is provided to produce the 3D structure, and where each manifold is configured to be positioned above a region or area where envelopes of radiative energy from at least two different sources overlap (see e.g., manifolds 230a and 230b in diagram 400 positioned over overlap regions 250a and 250b, respectively). To enable the manifolds may involve activating or turning on the operation of the manifolds to perform gas exchange.

At block 530, method 500 includes performing, by the one or more manifolds, a gas exchange within the build chamber. Performing the gas exchange includes concurrently performing multiple gas exchanges over different regions or areas of the build chamber. At block 535 within block 530, performing the gas exchange includes removing contaminated gas (e.g., contaminated gas 220) containing soot or other fusing or re-coating byproduct that results from producing the 3D structure (e.g., resulting from a fusing or re-coating operation). At block 540 within block 530, performing the gas exchange includes introducing or providing clean gas (e.g., clean gas 205) into the build chamber to move out and replace the contaminated gas. In some instances, performing the gas exchange includes removing, by each manifold contaminated gas and introducing, by each manifold, clean gas.

In another aspect of method 500, the one or more manifolds include multiple manifolds separately disposed along a length of the build chamber (see e.g., diagram 400 in FIG. 4), and performing the gas exchange includes performing, by each manifold, the gas exchange for a different region or area of the build chamber. As such, another aspect of method 500 includes enabling the one or more manifolds includes enabling multiple manifolds separately disposed or placed along a length of the build chamber such that each manifold performs the gas exchange for a different region or area of the build chamber. Enabling the one or more manifolds can include concurrently enabling multiple manifolds (e.g., more than one) disposed or positioned along the length of the build chamber.

In another aspect of method 500, when performing a fusing operation as in block 510, the number of envelopes of radiative energy used during the fusing operation can be N, where the number of manifolds performing the gas exchange is then N−1, and where N is a positive integer number greater or equal to 2.

In yet another aspect of method 500, the build chamber used in the method is a chamber configured for PBF additive manufacturing processes and includes a powder bed (e.g., powder bed 155), method 500 can further include laterally introducing, as part of the gas exchange, clean gas over the powder bed, and vertically removing, as part of the gas exchange and through the one or more manifolds, contaminated gas containing soot and/or other byproducts resulting from producing the 3D structure (see e.g., FIGS. 2A and 2C). In another aspect, method 500 can further include vertically introducing, as part of the gas exchange and through the one or more manifolds, clean gas, and laterally removing, as part of the gas exchange and over the powder bed, contaminated gas containing soot and/or other byproducts resulting from producing the 3D structure (see e.g., FIGS. 2B and 2C).

In yet another aspect of method 500, enabling the one or more manifolds disposed within the build chamber includes enabling the one or more manifolds to move along a vertical direction, a horizontal direction, a rotational direction, or a combination thereof relative to the top portion of the build chamber. As such, method 500 can include moving the one or more manifolds, individually or collectively, in a vertical direction (z direction), in one or more horizontal directions (x-y directions), and/or in a rotation. These movements can be used to better position the manifolds for gas exchange within the build chamber.

The configurations or implementations described above provide one approach to use multiple manifolds within a large area build chamber. Other configurations or implementations are described in more detail below in connection with FIGS. 6A-8D, which can also be combined with the features described above for PBF systems such as the PBF system illustrated in FIGS. 1A-1D or other PBF systems.

FIGS. 6A-6D show various diagrams that illustrate side views of a PBF system (e.g., PBF system 100) operation using grid-like plenums for gas exchange over print areas in accordance with aspects of this disclosure. As used in this disclosure, the term "plenum" may refer to manifolds or similar structures that can be used within a chamber to exchange gas by introducing clean gas and removing contaminated gas. As such, in this disclosure the term "plenum" and the term "manifold" may be used interchangeably to refer to similar structures.

In a diagram 600a in FIG. 6A, as described above, for a build chamber to be configured to fabricate larger build pieces (e.g., build piece 140), multiple radiative energy sources (e.g., electron or laser sources) may be used to fuse powder over a much larger build area that can be done with a single source. When multiple sources are used for a large area build operation, multiple manifolds may also be needed to effectively remove the soot generated over such a large area as a byproduct of the build operation. These manifolds need to be placed or positioned in such a way that they do not interfere with the radiative energy (e.g., electron or laser beams) generated by sources and provided into the build chamber to fuse the powder. Therefore, to avoid interfering with the electron or laser beams, the manifolds may be moved to different positions within the build chamber at different stages of operation.

In the example shown in diagram 600a, a build chamber such as build chamber 110 described above in connection with the example PBF system of FIGS. 1A-1D, e.g., as modified as described herein, or other PBF systems can include chamber top 410. The chamber top can have more than one window through which radiative energy (e.g., in the form of an electron or laser beam) is provided into build chamber 110 to fuse powder to add to build piece 140. For example, chamber top 410 can include windows 430a, 430b, and 430c, through which sources at different locations can respectively radiate beams (e.g., electron or laser beams) into build chamber 110. The use of multiple sources radiating through different windows allows for a fusing or re-coating operation to cover a large area over powder bed 155.

In this example, manifolds 230a, 230b, 230c, and 230d are positioned just below or adjacent to the chamber top 410 in such a way as to not interfere with the windows 430a, 430b, and 430c. For example, manifold 230a is positioned below chamber top 410 and to the left of window 430a, manifold 230b is positioned below chamber top 410 and between windows 430a and 430b, manifold 230c is positioned below chamber top 410 and between windows 430b and 430c, and manifold 230d is positioned below chamber top 410 and to the right of window 430c. Manifolds 230a, 230b, 230c, and 230d can form a grid-like structure and are aligned at the same or similar position below chamber top 410, e.g., a first position 610. When in first position 610, manifolds 230a, 230b, 230c, and 230d can be said to be in a first mode of operation. In this first mode of operation, manifolds 230a, 230b, 230c, and 230d are retracted such as to be out of the way for any fusing or re-coating operation.

Figure 6B:
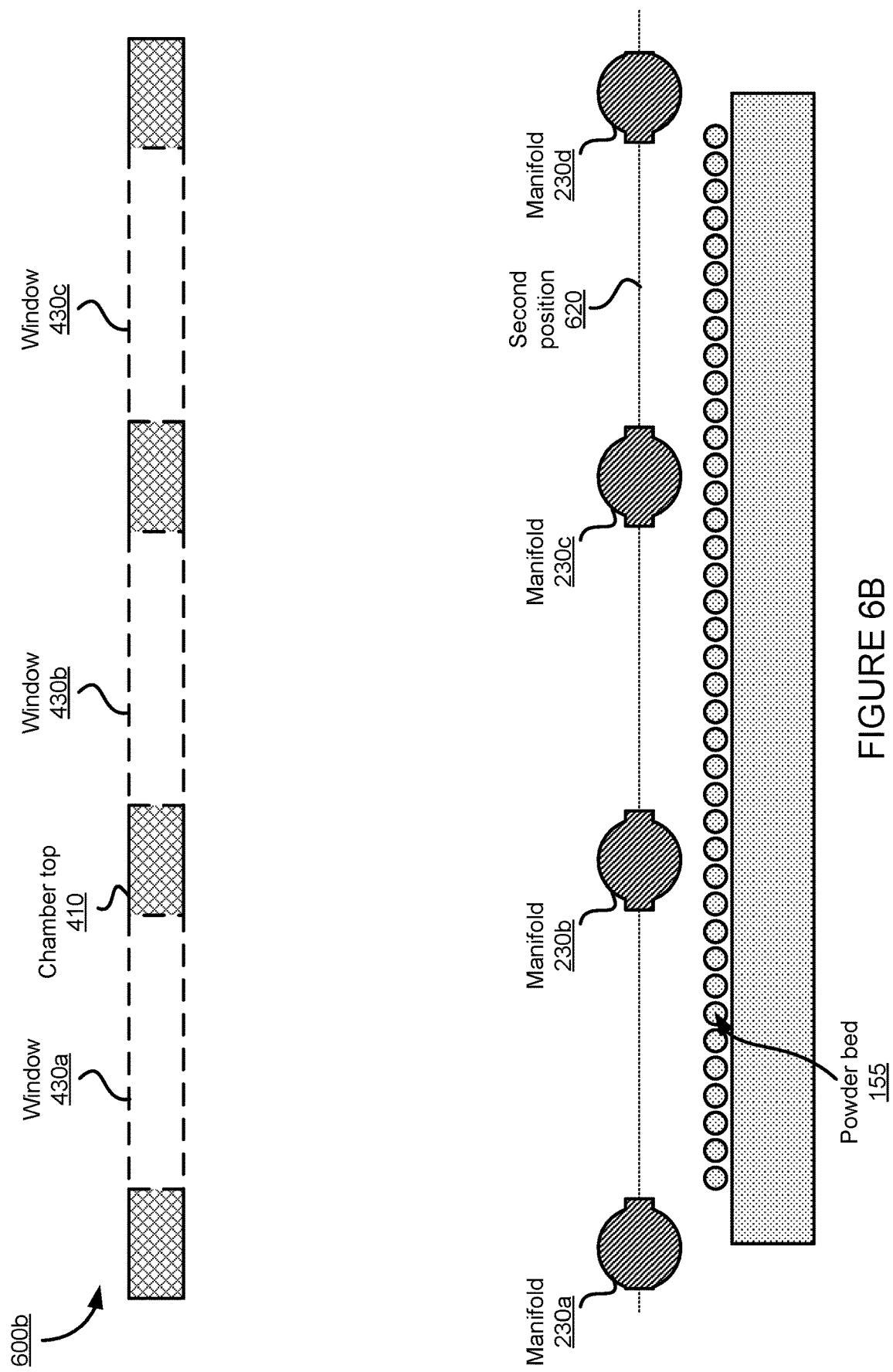

In a diagram 600b in FIG. 6B, manifolds 230a, 230b, 230c, and 230d are moved individually or collectively to another position away from chamber top 410 and closer or adjacent to powder bed 155 to perform a gas exchange, e.g., a second position 620. Manifolds 230a, 230b, 230c, and 230d are substantially aligned at the second position 620 as illustrated in diagram 600b. When in the second position 620, manifolds 230a, 230b, 230c, and 230d can be said to be in a second mode of operation in which gas exchange can be performed.

Figure 6C:
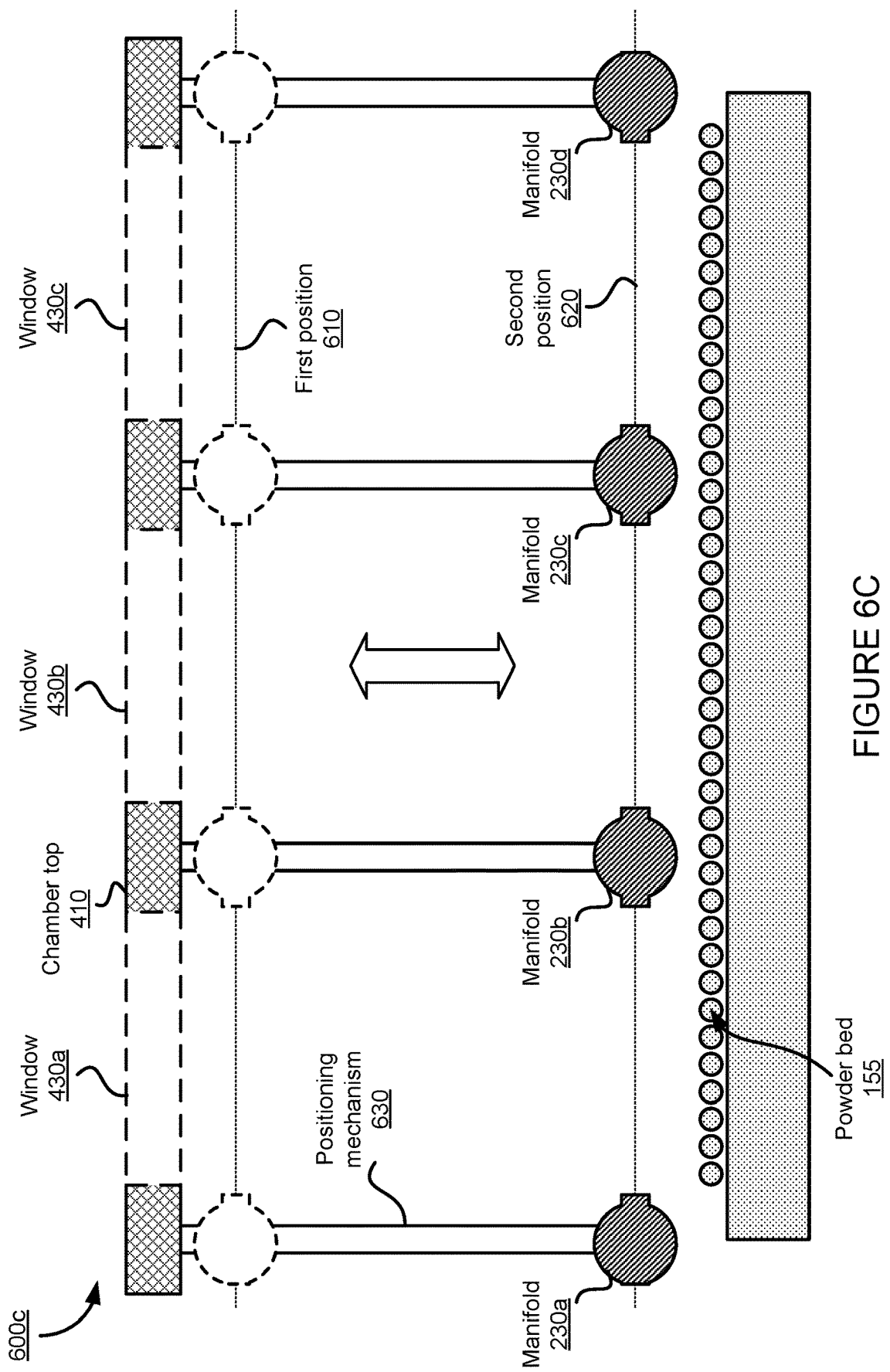

In diagram 600c in FIG. 6C, a vertical movement or translation of manifolds 230a, 230b, 230c, and 230d is illustrated. For example, manifolds can be in the first mode of operation along first position 610 adjacent chamber top 410 so as to not interfere with the electron or laser beams used during a fusing or re-coating operation. The manifolds can then be moved down as part of a second mode of operation to second position 620 adjacent to powder bed 155 to perform a gas exchange to remove soot or any other byproducts of the fusing or re-coating operation. Once the gas exchange is completed, the manifolds can then be moved back to first position 610 and into the first mode of operation.

Explicitly shown in diagram 600c is a positioning mechanism 630 that can provide vertical translation for the manifolds between first position 610 and second position 620 (and even to one or more positions in between). The positioning mechanism can move each manifold individually or all of the manifolds collectively to the appropriate position. The positioning mechanism is itself placed between the windows in chamber top 410 to avoid interfering with a fusing or re-coating operation. In some implementations, there can be a single positioning mechanism to handle the movement of all of the manifolds, while in other implementations there may be multiple positioning mechanisms to handle the movement of all of the manifolds, with one such implementation being the case where there is a dedicated positioning mechanism for each manifold. Additionally or alternatively, positioning mechanism 630 may enable translation in other directions. For example, positioning mechanism 630 may enable the movement of one or more of the manifolds in one or more lateral directions (x-y directions) and/or in a rotation.

In a diagram 600d in FIG. 6D, there is shown manifolds 230a, 230b, 230c, and 230d in second position 620 during a gas exchange operation. In this example, manifold 230a on the left side of the build chamber may be configured to introduce or provide clean gas (e.g., clean gas 205) to a region or area between the manifold 230a and manifold 230b corresponding to a left third of powder bed 155. In this case, manifold 230b may be configured to remove or extract contaminated gas (e.g., contaminated gas 220) from that region or area.

Similarly in this example, manifold 230b on the left/middle side of the build chamber may be configured to introduce or provide clean gas (e.g., clean gas 205) to a region or area between manifold 230b and manifold 230c corresponding to a middle third of powder bed 155. As noted above, manifold 230b may remove or extract contaminated gas (e.g., contaminated gas 220) from the left third of powder bed 155.

Also in this example, manifold 230c on the right/middle side of the build chamber may be configured to introduce or provide clean gas (e.g., clean gas 205) to a region or area between manifold 230c and manifold 230d corresponding to a right third of powder bed 155. The manifold 230c may remove or extract contaminated gas (e.g., contaminated gas 220) from the middle third of powder bed 155.

Moreover, manifold 230d on the right side of the build chamber may be configured to remove or extract contaminated gas (e.g., contaminated gas 220) from a region or area between manifold 230c and manifold 230d corresponding to a right third of powder bed 155.

While the examples in the diagrams 600a-600d show three windows and two manifolds as part of the overall architecture of build chamber 110, it is to be understood that this example is provided for illustrative purposes and a greater number of windows and manifolds may be used to increase the effective build area and, consequently, the size of the 3D pieces that can be manufactured or fabricated using a build chamber such as build chamber 110. Moreover, there may be instances in which fewer windows and manifolds may be used in implementations or configurations such as the ones described in connection with diagrams 600a-600d in FIGS. 6A-6D.

Figure 7:
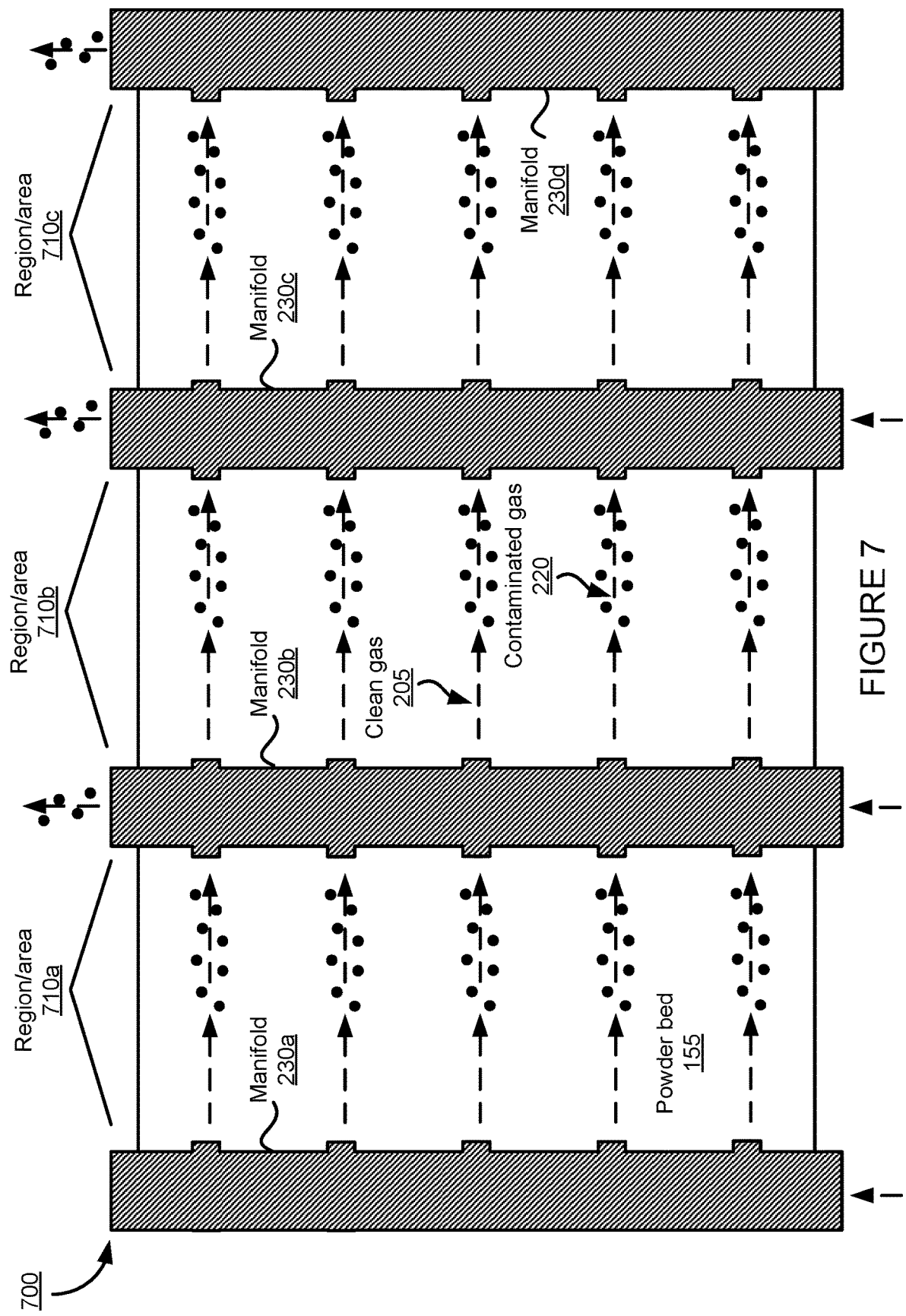
FIG. 7 illustrates a conceptual top view of the PBF system in FIGS. 6A-6D in accordance with aspects of this disclosure.

A diagram 700 in FIG. 7 illustrates a conceptual top view of the PBF system in FIGS. 6A-6D in accordance with aspects of this disclosure. In this example, manifolds 230a, 230b, 230c, and 230d are in second position 620 above or adjacent to powder bed 155 to perform a gas exchange operation. As described above in connection with FIG. 6D, manifold 230a provides clean gas 205 to a region or area 710a that generally covers a left third of powder bed 155 and manifold 230b removes, retrieves, or extracts contaminated gas 220 from the region or area 710a. Similarly, manifold 230b provides clean gas 205 to a region or area 710b that generally covers a middle third of powder bed 155 and manifold 230c removes, retrieves, or extracts contaminated gas 220 from the region or area 710b. Moreover, manifold 230c provides clean gas 205 to a region or area 710c that generally covers a right third of powder bed 155 and manifold 230d removes, retrieves, or extracts contaminated gas 220 from the region or area 710c.

FIGS. 8A-8D show diagrams 800a, 800b, 800c, and 800d that illustrate different examples of manifolds used in grid-like plenums for gas exchange over print areas as described above in connection with the example PBF system of FIGS. 1A-1D, e.g., as modified as described herein, and FIGS. 6A-7.

For example, in diagram 800a, a first configuration of a manifold 230 is shown that may be used at one end of the print area (e.g., powder bed 155) to provide clean gas (e.g., clean gas 205) through one or more inlets 210 such as manifold 230a in diagrams 600a-600d and 700. The manifold in this configuration is an elongated structure that can have a circular or elliptical elongated structure (as shown) or can have a different shape (e.g., a square or rectangular elongated structure). The manifold in diagram 800a can have an opening in one end through which the clean gas is provided to manifold 230, while the opposite end of the manifold can be closed. Moreover, although inlets 210 are shown as circular or elliptical inlets more or less evenly spaced, other configurations are also possible where the inlets are of different shapes (e.g., square, rectangular) and/or where the inlets are not evenly or uniformly spaced.

In diagram 800b, a second configuration of a manifold 230 is shown that may be used at one end of the print area (e.g., powder bed 155) to remove, extract, or retrieve contaminated gas (e.g., contaminated gas 220) through one or more outlets 235 such as manifold 230d in diagrams 600a-600d and 700, for example. The manifold in this configuration is an elongated structure that can have a circular or elliptical elongated structure (as shown) or can have a different shape (e.g., a square or rectangular elongated structure). The manifold in diagram 800b can have an opening in one end through which the contaminated gas is removed from manifold 230, while the opposite end of the manifold can be closed. Moreover, although outlets 235 are shown as circular or elliptical outlets more or less evenly spaced, other configurations are also possible where the outlets are of different shapes (e.g., square, rectangular) and/or where the outlets are not evenly or uniformly spaced.

In diagrams 800c and 800d, different configurations are shown of manifolds 230 that can introduce clean gas and remove contaminated gas, such as manifolds 230b and 230c shown in diagrams 600a-600d and 700, for example. The configuration described in diagram 800c has the contaminated gas exiting on one end of the manifold and the clean gas being provided on the same end of the manifold. In the configuration described in diagram 800d, the contaminated gas exits on one end of the manifold and the clean gas is provided on an opposite end of the manifold.

Manifolds 230 in diagrams 800a, 800b, 800c, and 800d can be part of a grid-like structure that includes other manifolds and where the manifolds can be moved in one or more directions either individually (e.g., each separately) or collectively (e.g., all together at the same time).

In summary, FIGS. 1A-1D (e.g., as modified with one or more features described herein) and FIGS. 6A-8D describe various aspects of another apparatus and another method for producing 3D structures or pieces. Accordingly, the apparatus can include a build chamber (e.g., build chamber 110) within which the 3D structure is produced, and multiple manifolds (e.g., manifolds 230a, 230b, 230c, and 230d as shown in FIGS. 6A-7) disposed within the build chamber. As shown in diagrams 600a-600d and 700 in FIGS. 6A-7, the manifolds are configured to perform a gas exchange within the build chamber. The manifolds are further configured to be moved to a first position (e.g., first position 610) adjacent to a top portion of the build chamber (e.g., chamber top 410) during a first mode of operation and to be moved to a second position (e.g., second position 620) away from the top portion of the build chamber during a second mode of operation (see e.g., FIG. 6C). In one example, the first mode of operation is a fusing mode to perform a first pass of a layer of the 3D structure and the second mode of operation is a re-coating mode to perform a second pass of the layer of the 3D structure.

In an aspect of this apparatus, the manifolds are separately disposed along a length of the build chamber such that any two consecutive manifolds perform the gas exchange for a different region or area of the build chamber (see e.g., diagram 700 in FIG. 7). Moreover, the manifolds in the apparatus can be separately disposed along a length of the build chamber such that each window in the top portion of the build chamber is positioned between two consecutive manifolds (see e.g., diagram 600a in FIG. 6A).

The apparatus can include a positioning mechanism (e.g., positioning mechanism 630) configured to move the manifolds to the first position during the first mode of operation and to move the manifolds to the second position during the second mode of operation.

The apparatus can also include an optical assembly disposed opposite a powder bed (e.g., powder bed 155) in the build chamber and having multiple sources of radiative energy (e.g., one or more radiative energy sources 120 and/or one or more respective deflectors 130 as shown in FIGS. 1A-1D), the radiative energy from at least one of the sources being provided into the build chamber during a build operation to produce the 3D structure. The top portion of the build chamber (e.g., chamber top 410) includes a window for each of the sources, the radiative energy from the at least one of the sources being provided into the build chamber through a corresponding window (see e.g., windows 430a, 430b, and 430c in diagrams 600a-600d in FIGS. 6A-6D). The number of the windows in the top portion of the build chamber is N, and a number of the manifolds is N+1, with N being a positive integer number (e.g., N≥1).

Figure 8A:
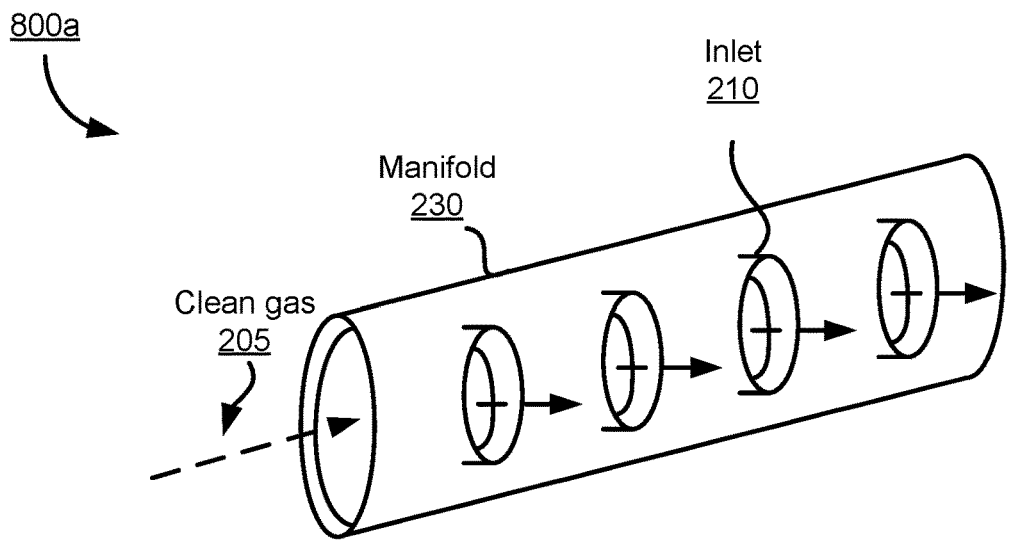
FIGS. 8A-8D illustrate different examples of manifolds used in grid-like plenums for gas exchange over print areas in accordance with aspects of this disclosure.
Figure 8B:
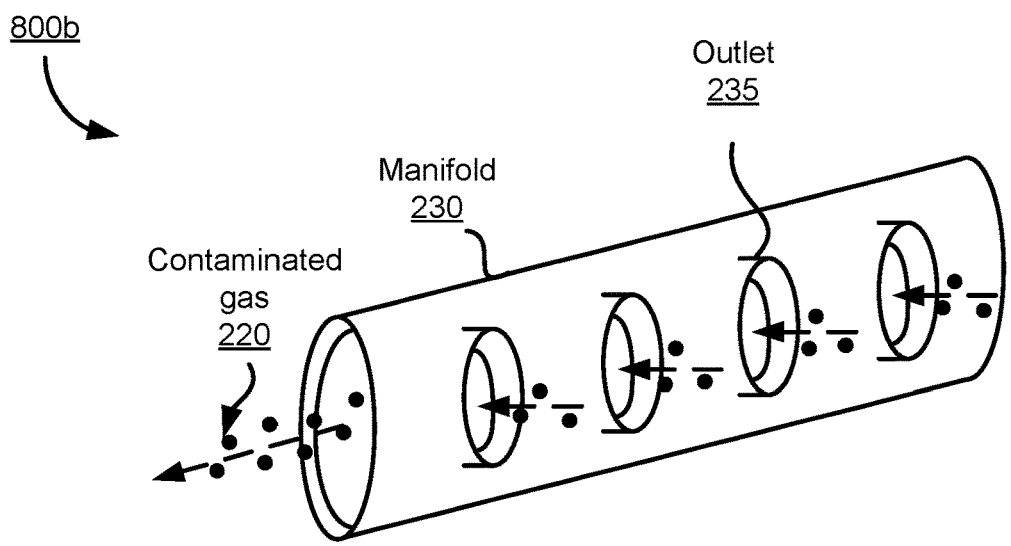
Figure 8C:
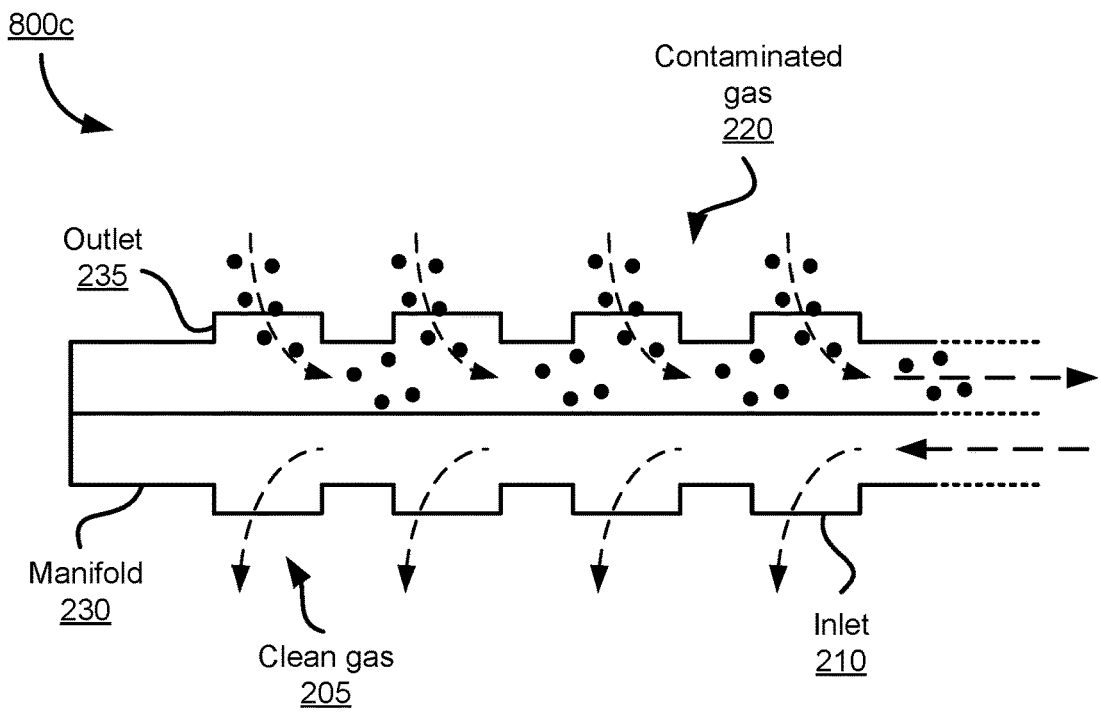
Figure 8D:
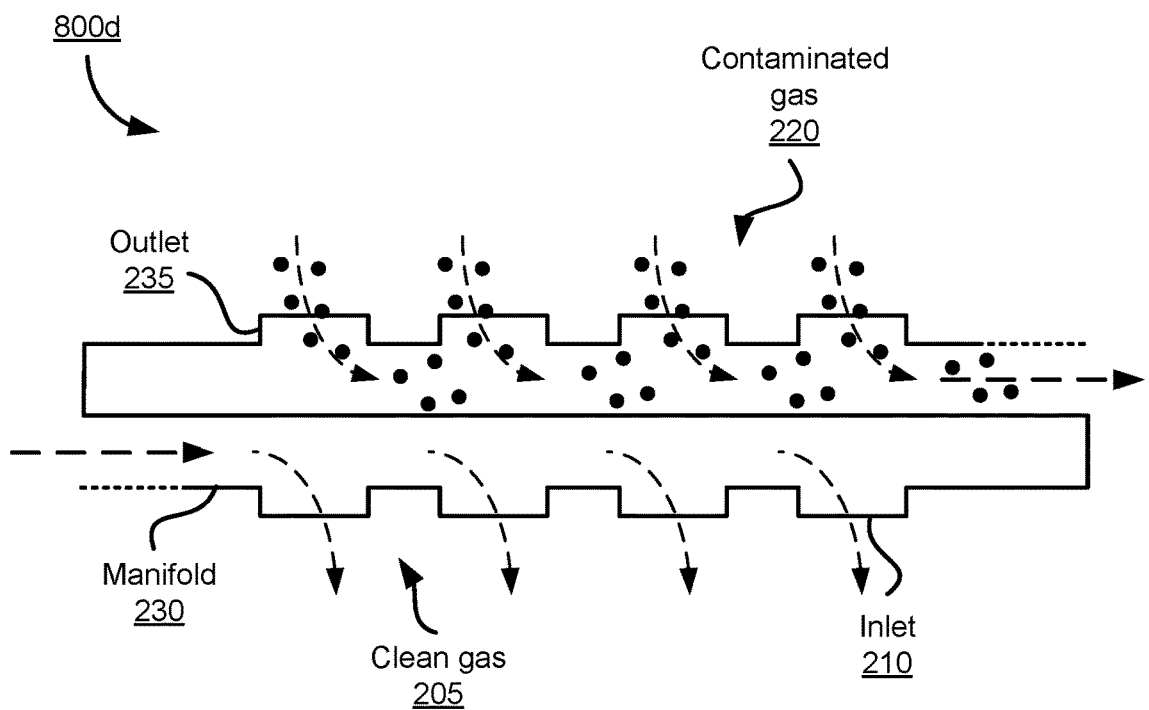

In one implementation of the apparatus, a first of the manifolds is disposed at an end of the build chamber and is configured to introduce clean gas (see e.g., manifold 230a in the diagram 700 in FIG. 7 and manifold 230 in diagram 800a in FIG. 8A), a second of the manifolds is disposed at another end of the build chamber and is configured to remove contaminated gas containing soot resulting from producing the 3D structure (see e.g., manifold 230d in the diagram 700 in FIG. 7 and manifold 230 in diagram 800b in FIG. 8B), and any of the remaining manifolds (middle manifolds) are separately disposed between the ends of the build chamber, and are configured to both introduce clean gas and to remove contaminated gas (see e.g., manifolds 230b and 230c in diagram 700 in FIG. 7 and manifolds 230 in diagrams 800c and 800d in FIGS. 8C and 8D, respectively). In this implementation, the first manifold includes one or more gas inlets, the second manifold includes one or more gas outlets, and the remaining manifolds include one or more gas inlets and one or more gas outlets.

In another aspect of the other apparatus described above for producing 3D structures or pieces, the build chamber can be a chamber configured for PBF additive manufacturing processes and includes a powder bed (e.g., powder bed 155, and the second position to which the manifolds are moved during the second mode of operation (e.g., second position 620) is closer to the powder bed than to the top portion of the build chamber.

Figure 9:
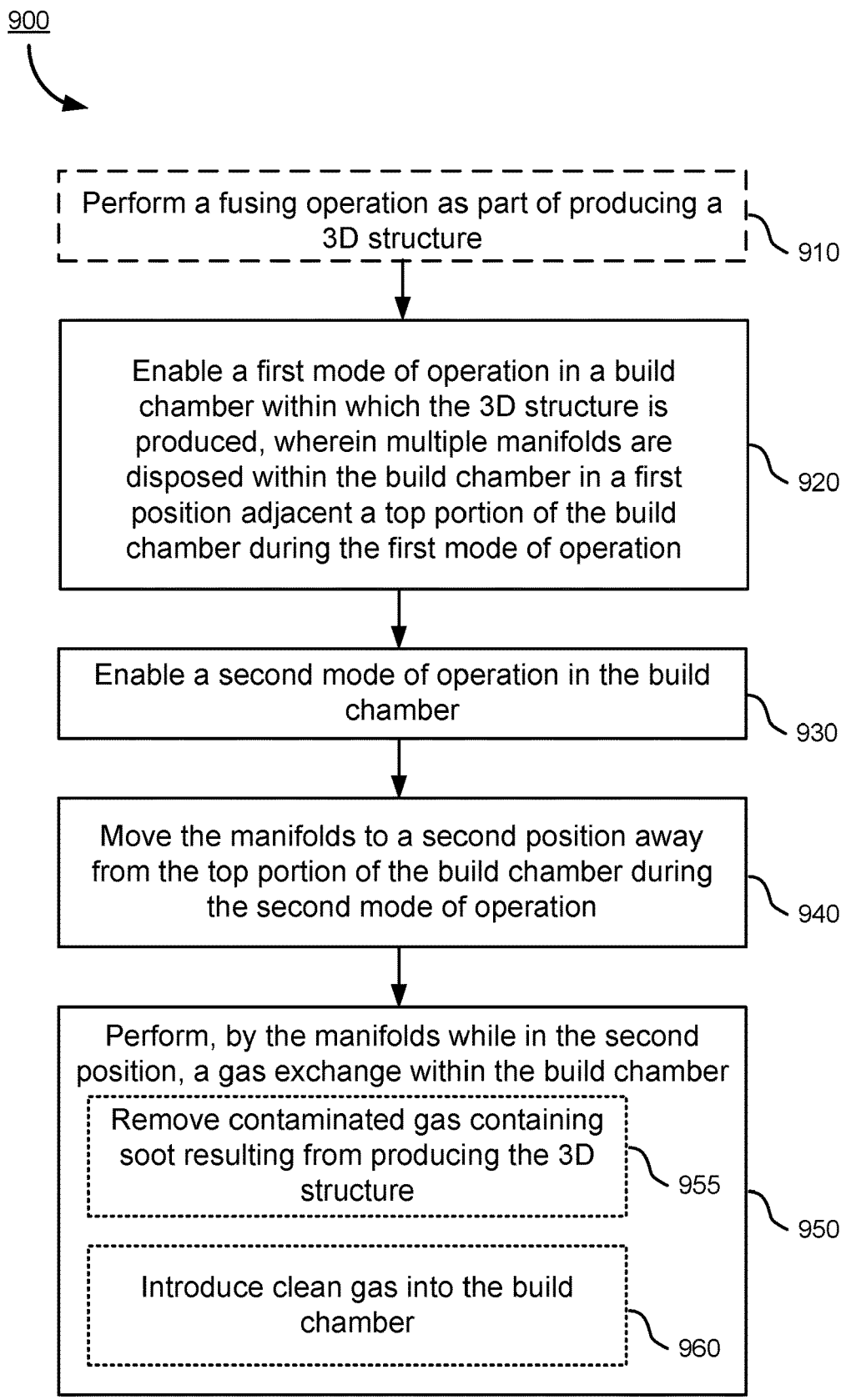
FIG. 9 illustrates a flow diagram of an exemplary method for producing a 3D structure by using grid-like plenums for gas exchange over print areas in accordance with aspects of this disclosure.

A flow diagram is shown in FIG. 9 to illustrate an example of a method 900 for producing a 3D structure by using grid-like plenums for gas exchange over different print areas. The method may be performed based on the apparatus described above in connection with FIGS. 1A-1D (e.g., as modified with one or more features described herein) and FIGS. 6A-8D.

At block 910, method 900 optionally includes performing a fusing operation (e.g., fusion mode) as part of producing a 3D structure. Additionally or alternatively, a re-coating operation (e.g., re-coating mode) may be performed at block 910.

At block 920, method 900 includes enabling a first mode of operation in a build chamber (e.g., build chamber 110) within which the 3D structure is produced, wherein multiple manifolds (e.g., manifolds 230a, 230b, 230c, and 230d in the diagram 600a in FIG. 6A) are disposed within the build chamber in a first position (e.g., first position 610) adjacent a top portion of the build chamber (e.g., chamber top 410) during the first mode of operation.

At block 930, method 900 includes enabling a second mode of operation in the build chamber.

At block 940, method 900 includes moving the manifolds to a second position (e.g., second position 620) away from the top portion of the build chamber during the second mode of operation (see e.g., diagrams 600b, 600c, and 600d in FIGS. 6B, 6C, and 6D, respectively).

At block 950, method 900 includes performing, by the manifolds while in the second position, a gas exchange within the build chamber (see e.g., diagram 700 in FIG. 7). At block 955 within block 950, performing the gas exchange includes removing contaminated gas (e.g., contaminated gas 220) containing soot or other fusing or re-coating byproduct that results from producing the 3D structure (e.g., resulting from a fusing or re-coating operation). At block 960 within block 950, performing the gas exchange includes introducing or providing clean gas (e.g., clean gas 205) into the build chamber to move out and replace the contaminated gas.

In an aspect of method 900, moving the manifolds to the second position includes vertically lowering each of the manifolds to a same distance away from the top portion of the build chamber (see e.g., diagram 600c in FIG. 6C).

In another aspect of method 900, the method includes enabling the first mode of operation again after the second mode of operation, and moving the manifolds back to the first position once the first mode of operation is again enabled. Moving the manifolds back to the first position may include vertically raising each of the manifolds to be adjacent to the top portion of the build chamber (see e.g., diagram 600c in FIG. 6C).

In another aspect of method 900, the manifolds can be separately disposed along a length of the build chamber, and performing the gas exchange includes performing, by any two consecutive manifolds, the gas exchange for a different region or area of the build chamber (see e.g., diagram 700 in FIG. 7).

In yet another aspect of method 900, performing the gas exchange includes concurrently (e.g., at substantially the same time) performing multiple gas exchanges over different regions or areas of the build chamber (see e.g., diagram 700 in FIG. 7). In some implementations, however, there may be temporal offsets between the gas exchanges performed on different regions or areas.

In another aspect of method 900, the method further includes performing, as part of the first mode of operation, a first pass of a layer of the 3D structure; and performing, as part of the second mode of operation, a second pass of the layer of the 3D structure. In one example, performing the second pass includes performing a re-coating operation.

In yet another aspect of method 900, the top portion of the build chamber (e.g., chamber top 410) includes multiple windows (e.g., windows 430a, 430b, and 430c in diagram 600a in FIG. 6A) for radiative energy to be provided into the build chamber to produce the 3D structure. The number of the windows can be N, and the number of the manifolds is N+1, with N being a positive integer number (e.g., N≥1).

In another aspect of method 900, the top portion of the build chamber (e.g., chamber top 410) includes multiple windows (e.g., windows 430a, 430b, and 430c in the diagram 600a in FIG. 6A) for radiative energy to be provided into the build chamber to produce the 3D structure, and each of the windows is positioned between two consecutive manifolds (see e.g., diagram 600a in FIG. 6A).

In yet another aspect of method 900, performing the gas exchange includes introducing clean gas by a first of the manifolds disposed at an end of the build chamber (e.g., manifold 230a in the diagram 700 in FIG. 7), removing contaminated gas containing soot resulting from producing the 3D structure by a second of the manifolds disposed at another end of the build chamber (e.g., manifold 230d in diagram 700 in FIG. 7), and introducing clean gas and removing contaminated gas by any of the remaining manifolds disposed between the ends of the build chamber (e.g., manifolds 230b and 230c in diagram 700 in FIG. 7).

In another aspect of method 900, the build chamber is a chamber configured for PBF additive manufacturing processes and includes a powder bed (e.g., powder bed 155), and moving the manifolds to a second position includes moving the manifolds closer to the powder bed than to the top portion of the build chamber (see e.g., diagram 600b in FIG. 6B).

In another aspect of method 900, enabling the first mode of operation includes performing a gas exchange by the manifolds while in the first position (e.g., first position 610) that is different from the gas exchange performed by the manifolds while in the second position (e.g., second position 620), and the gas exchange by the manifolds while in the first position including creating a down pressure within the build chamber by introducing an amount of clean gas that is larger than an amount being removed of contaminated gas containing soot resulting from producing the 3D structure. That is, there can be a gas exchange performed not only when the manifolds are in the second position but additionally or alternatively when the manifolds are in the first position.

The techniques described above to enhance the way in which additively manufactured parts can be made enables manufacturers to generate shapes, configurations, and structures that are not available in conventional manufacturing processes. Further, advances in AM technologies are expected to continue. Print speed is continually increasing. 3-D printer form factor has also seen regular advances. This means, among other things, that the area of the build platform as compared with the size of the component to be printed is becoming progressively larger as relevant as build plates and printer profiles cross unprecedented boundaries in size, speed and sophistication. The availability and suitability of candidate materials and chemical compounds for use in AM is likewise increasing, meaning among other things that the versatility of AM should continue to impact other applications and other parts of the transport structures.

In one aspect of the techniques described in this disclosure, complete structures can be additively manufactured, including transport structures such as automobile parts. However, using substantially similar principles as outlined in this disclosure, practitioners skilled in the art will recognize that analogous techniques and identical principles can apply with equal force to numerous classes of transport structures—planes, trains, busses, boats, snowmobiles, motorcycles, and aircraft to name only a few.

The present disclosure addresses key obstacles and provides solutions for a various shortcomings in the art. The modular design may present easier reparability options for the consumer. As build plates and printer profiles evolve to match or exceed the size of such transports, the manufacturer has the option to decide to maintain modularity of the frame. In some embodiments, the frame can be printed in a single rendering with built in indentations or connections to maintain modularity.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for printing nodes and interconnects. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus for producing a three-dimensional (3D) structure, comprising:
    a build chamber;
    a powder bed in the build chamber;
    at least one radiative energy system configured to generate a plurality of envelopes of radiative energy that overlap to form a first overlap region and a second overlap region within the build chamber;
    a first manifold disposed within the build chamber, positioned above the first overlap region and including a first opening in a lowest portion of the first manifold and oriented toward the first overlap region, the first manifold being configured to supply clean gas to the build chamber to remove byproducts from the first overlap region; and
    a second manifold disposed within the build chamber, positioned above the second overlap region and including a second opening in a lowest portion of the second manifold and oriented toward the second overlap region, the second manifold being configured to remove contaminated gas from the build chamber to remove byproducts from the second overlap region; and
    a position mechanism to move the first and second manifolds vertically between a first position positioned adjacent the first and second overlap regions during a first mode of operation and away from the first and second overlap regions during a second mode of operation.

2. The apparatus of claim 1, wherein the build chamber further includes at least:
    a first gas outlet configured to remove from the build chamber contaminated gas, or
    a first gas inlet configured to introduce into the build chamber a clean gas.

3. The apparatus of claim 2, wherein the build chamber further includes at least:
    a second gas outlet configured to remove from the build chamber the contaminated gas, or
    a second gas inlet configured to introduce into the build chamber, as part of the gas exchange, the clean gas.

4. The apparatus of claim 1, wherein the first manifold includes an elongated structure vertically positioned above the first overlap region.

5. The apparatus of claim 1, wherein the first manifold and the second manifold are separately disposed along a length of the build chamber such that each manifold performs a gas exchange for a different region of the build chamber.

6. The apparatus of claim 1, wherein the build chamber comprises two or more windows through which radiative energy from the at least one radiative energy system is provided.

7. The apparatus of claim 1, wherein the first manifold or the second manifold is configured to perform a gas exchange during a mode of operation of the build chamber, the mode of operation being at least a fusing mode or a re-coating mode.

8. The apparatus of claim 1, wherein the first manifold or the second manifold is configured to move along a vertical direction, a horizontal direction, a rotational direction, or a combination thereof relative to a top portion of the build chamber.

9. An apparatus for producing a three-dimensional (3D) structure, comprising:
    a build chamber configured to contain a powder bed;
    at least one radiative energy system configured to generate two different envelopes of radiative energy that overlap in an overlap region within the build chamber;
    at least one manifold disposed within the build chamber, wherein the at least one manifold extends from a side of the powder bed to a position above the powder bed, the at least one manifold including a plurality of openings and configured to either transfer a clean gas supplied at the side of the powder bed to the plurality of openings above the powder bed or to transfer contaminated gas from the plurality of openings to the side of the powder bed; and
    a position mechanism to move the at least one manifold vertically between a first position positioned adjacent the overlap region during a first mode of operation and away from the overlap region during a second mode of operation.

10. The apparatus of claim 9, further comprising one or more additional manifolds, wherein the at least one manifold and the one or more additional manifolds are separately disposed along a length of the build chamber such that any two consecutive manifolds perform a gas exchange for a different region of the build chamber.

11. The apparatus of claim 9, further comprising one or more additional manifolds, wherein the at least one manifold and the one or more additional manifolds are positioned adjacent to a top portion of the build chamber during the first mode of operation and positioned away from the top portion of the build chamber during the second mode of operation, and
wherein one of fusing or re-coating is performed during the first mode of operation and a gas exchange is performed by the at least one manifold and the one or more additional manifolds during the second mode of operation.

12. The apparatus of claim 11, wherein the at least one manifold and the one or more additional manifolds are repositioned adjacent to the top portion of the build chamber in the first mode of operation after the gas exchange is performed during the second mode of operation.

13. The apparatus of claim 11, wherein the at least one manifold and the one or more additional manifolds perform an additional gas exchange during the first mode of operation that is different from the gas exchange performed during the second mode of operation, the additional gas exchange comprising introducing an amount of clean gas that is larger than an amount of contaminated gas to be removed.

14. The apparatus of claim 9, further comprising one or more additional manifolds, wherein the at least one radiative energy system is disposed opposite the powder bed in the build chamber and provides radiative energy into the build chamber during the first mode of operation, wherein the at least one manifold and the one or more additional manifolds are positioned adjacent to a top portion of the build chamber during the first mode of operation.

15. The apparatus of claim 14, wherein the top portion of the build chamber includes one or more windows through which the radiative energy from the at least one radiative energy system is provided, the apparatus further comprising a number of the manifolds that is one greater than a number of the one or more windows.

16. The apparatus of claim 15, wherein the at least one manifold and the one or more additional manifolds are separately disposed along a length of the build chamber such that each of the one or more windows in the top portion of the build chamber is positioned between two consecutive manifolds.

17. The apparatus of claim 9, further comprising one or more additional manifolds,
wherein a first manifold of the one or more additional manifolds is disposed at an end of the build chamber and is configured to introduce clean gas,
a second manifold of the one or more additional manifolds is disposed at another end of the build chamber and is configured to remove contaminated gas, and
one or more remaining manifolds of the at least one manifold and the one or more additional manifolds are separately disposed between the ends of the build chamber and are configured to introduce the clean gas and to remove the contaminated gas.

18. The apparatus of claim 17, wherein
the first manifold includes multiple gas inlets to introduce the clean gas,
the second manifold includes multiple gas outlets to remove the contaminated gas, and
the one or more remaining manifolds include additional gas inlets to introduce the clean gas and additional gas outlets to remove the contaminated gas.

19. The apparatus of claim 1, wherein the first manifold and the second manifold are positioned adjacent to a top portion of the build chamber during the first mode of operation and positioned away from the top portion of the build chamber during the second mode of operation.

20. The apparatus of claim 9, wherein the at least one manifold is configured to transfer a clean gas supplied at the side of the powder bed to at least a first opening of the plurality of openings and transfer a contaminated gas from at least a second opening of the plurality of openings to an another side of the powder bed.

21. The apparatus of claim 9, wherein the at least one manifold including a first side opening at the side of the powder bed configured to supply a clean gas to at least a first opening of the plurality of openings, and a second side opening at an another side of the powder bed configured to transfer a contaminated gas from at least a second opening of the plurality of openings to the another side.

* * * * *